(12) United States Patent
Nerses et al.

(10) Patent No.: US 7,639,663 B1
(45) Date of Patent: *Dec. 29, 2009

(54) METHOD AND APPARATUS FOR DYNAMIC CHANNEL ACCESS WITHIN WIRELESS NETWORKS

(75) Inventors: Annita Nerses, Arlington, VA (US);
Robert M. Wetstein, Nanuet, NY (US);
Kaushik B. Patel, Bridgewater, NJ (US);
Jon Schafer, Princeton Junction, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 363 days.

This patent is subject to a terminal disclaimer.

(21) Appl. No.: 11/071,587

(22) Filed: Mar. 4, 2005

(51) Int. Cl.
*H04B 7/212* (2006.01)
*H04L 12/413* (2006.01)

(52) U.S. Cl. .................. 370/347; 370/445; 370/348; 455/552.1

(58) Field of Classification Search .......... 370/445, 370/252, 328, 378, 338; 455/552.1
See application file for complete search history.

(56) References Cited

U.S. PATENT DOCUMENTS

| | | | |
|---|---|---|---|
| 4,093,153 | A | 6/1978 | Bardash et al. |
| 4,574,378 | A | 3/1986 | Kobayashi |
| 5,206,452 | A | 4/1993 | Stamper et al. |
| 6,300,903 | B1 * | 10/2001 | Richards et al. ............ 342/450 |
| 6,331,973 | B1 | 12/2001 | Young et al. |
| 6,349,091 | B1 * | 2/2002 | Li ............................. 370/238 |
| 6,469,997 | B1 | 10/2002 | Dorenbosch et al. |
| 6,504,829 | B1 | 1/2003 | Young et al. |
| 6,574,206 | B2 | 6/2003 | Young |
| 6,628,620 | B1 | 9/2003 | Cain |
| 6,768,730 | B1 | 7/2004 | Whitehill |
| 6,859,463 | B1 * | 2/2005 | Mayor et al. ................ 370/445 |

(Continued)

FOREIGN PATENT DOCUMENTS

EP 1657854 A1 6/2004

(Continued)

OTHER PUBLICATIONS

Tony Ballardie et al., "Core Based Trees (CBT)", An Architecture for Scalable Inter-Domain Multicast Routing, pp. 85-95.

(Continued)

*Primary Examiner*—Lester Kincaid
*Assistant Examiner*—Matthew Sams
(74) *Attorney, Agent, or Firm*—Edell, Shapiro & Finnan, LLC

(57) ABSTRACT

The present invention protocol offers guaranteed Quality of Service (QoS) for a predetermined number of circuits in a highly dynamic, scalable network. The present invention protocol employs a Time Division Multiple Access (TDMA) reservation scheme to transmit deterministic data (e.g., image data) to a destination, while utilizing a Carrier Sense Multiple Access/Collision Avoidance (CSMA/CA) contention scheme to support non-deterministic data traffic. The protocol operates over a link-state based routing protocol that reliably floods routing and resource reservation information to the nodes in the network. Moreover, the present invention capitalizes on certain properties of a radio, such as a RAKE type receiver, to enable simultaneous re-transmissions of resource and route reservation information to constructively interfere and enhance the strength and range of the signal.

32 Claims, 14 Drawing Sheets

U.S. PATENT DOCUMENTS

| | | | |
|---|---|---|---|
| 6,967,944 B2 * | 11/2005 | Choi | 370/348 |
| 6,980,541 B2 | 12/2005 | Shvodian | |
| 7,085,541 B2 | 8/2006 | Redi et al. | |
| 7,327,683 B2 | 2/2008 | Ogier et al. | |
| 7,391,789 B2 * | 6/2008 | Kang et al. | 370/445 |
| 7,502,360 B2 | 3/2009 | Liu et al. | |
| 2001/0045883 A1 | 11/2001 | Holdaway et al. | |
| 2002/0037014 A1 * | 3/2002 | Myojo et al. | 370/437 |
| 2002/0089945 A1 | 7/2002 | Belcea | |
| 2002/0141375 A1 * | 10/2002 | Choi | 370/347 |
| 2002/0176399 A1 | 11/2002 | Wilmer | |
| 2002/0191573 A1 | 12/2002 | Whitehill et al. | |
| 2002/0194384 A1 | 12/2002 | Habetha | |
| 2003/0033394 A1 | 2/2003 | Stine | |
| 2003/0120809 A1 | 6/2003 | Bellur et al. | |
| 2003/0125066 A1 | 7/2003 | Habetha | |
| 2003/0142645 A1 | 7/2003 | Belcea | |
| 2003/0179742 A1 | 9/2003 | Ogier et al. | |
| 2003/0202465 A1 | 10/2003 | Cain | |
| 2003/0231584 A1 | 12/2003 | Zeitfuss | |
| 2004/0003111 A1 | 1/2004 | Maeda et al. | |
| 2004/0018839 A1 | 1/2004 | Andric et al. | |
| 2004/0028018 A1 | 2/2004 | Can | |
| 2004/0028130 A1 * | 2/2004 | May et al. | 375/240.08 |
| 2004/0029553 A1 | 2/2004 | Cain | |
| 2004/0032847 A1 | 2/2004 | Cain | |
| 2004/0042417 A1 | 3/2004 | Kennedy | |
| 2004/0152420 A1 | 8/2004 | Redi et al. | |
| 2005/0050221 A1 | 3/2005 | Tasman et al. | |
| 2006/0198346 A1 | 9/2006 | Liu et al. | |

FOREIGN PATENT DOCUMENTS

| | | |
|---|---|---|
| GB | 2371450 A | 7/2002 |
| WO | 03021885 | 3/2003 |
| WO | 03073775 | 9/2003 |
| WO | 03088587 | 10/2003 |
| WO | WO 2005/018161 A1 | 2/2005 |

OTHER PUBLICATIONS

Mario Gerla et al., "Multicluster, Mobile, Multimedia Radio Network", Wireless Networks (1995) pp. 255-265.

J. Moy, "OSPF Version 2", RFC 1583, Mar. 1994.

Charles Perkins, "Ad Hoc on Demand Distance Vector (AODV) Routing", Internet draft, Nov. 20, 1997.

Wei Peng et al., "On the Reduction of Broadcast Redundancy in Mobile and Ad Hoc Networks", MobiHoc 2000, Sigmobile, Aug. 2000, pp. 129-130.

Marc R. Pearlman et al., "Using Multi-hop Acknowledgements to Discover and Reliably Communicate Over Unidirectional Links in Ad Hoc Networks", IEEE, 2000, pp. 532-536.

Marc Mosko et al., "A Self-Correcting Neighbor Protocol for Mobile Ad-Hoc Wireless Networks", IEEE, 2002, pp. 556-560.

Sunlin, R.C., "A hybrid distributed slot assignment TDMA channel access protocol", Military Communications Conference, 1990, MILCOM '90, Conference Record, 'A New Era'. 1990 IEEE, vol. 3, pp. 934-938, Sep. 30-Oct. 3, 1990.

Sharp, B.A. et al., "Hybrid TDMA/CSMA protocol for self managing packet radio networks", Universal Personal Communications. 1995. Record., 1995 Fourth IEEE International Conference on, pp. 929-933, Nov. 6-10, 1995.

Papavassiliou, S. et al., "Performance evaluation framework and quality of service issues for mobile ad hoc networks in the MOSAIC ATD", MILCOM 2000. 21$^{st}$ Century Military Communications Conference Proceedings, vol. 1, pp. 297-303, Oct. 22-25, 2000.

Fontana, R. et al., "Recent advances in ultra wideband communications systems", IEEE Conference on Ultra Wideband Systems and Technologies, 2002 Digest of Papers, pp. 129-133, May 21-23, 2002.

R. Ramanathan, et al, Hierarchically-organized, multihop mobile wireless networks for quality-of-service support, Mobile Networks and Applications 3, 1998.

System Requirements Specification for the SUO SAS Networking Subsystem, Feb. 13, 2002.

* cited by examiner

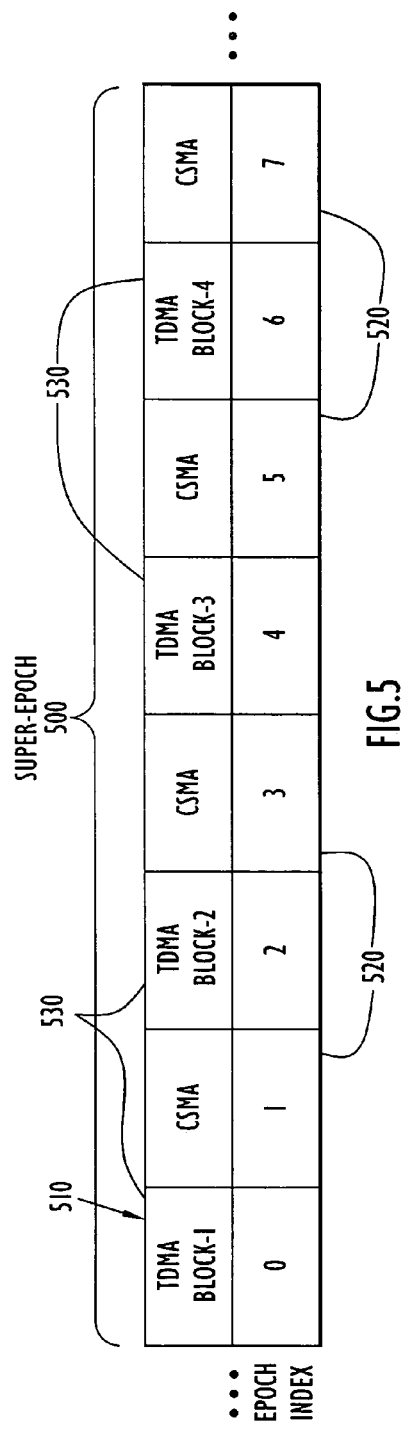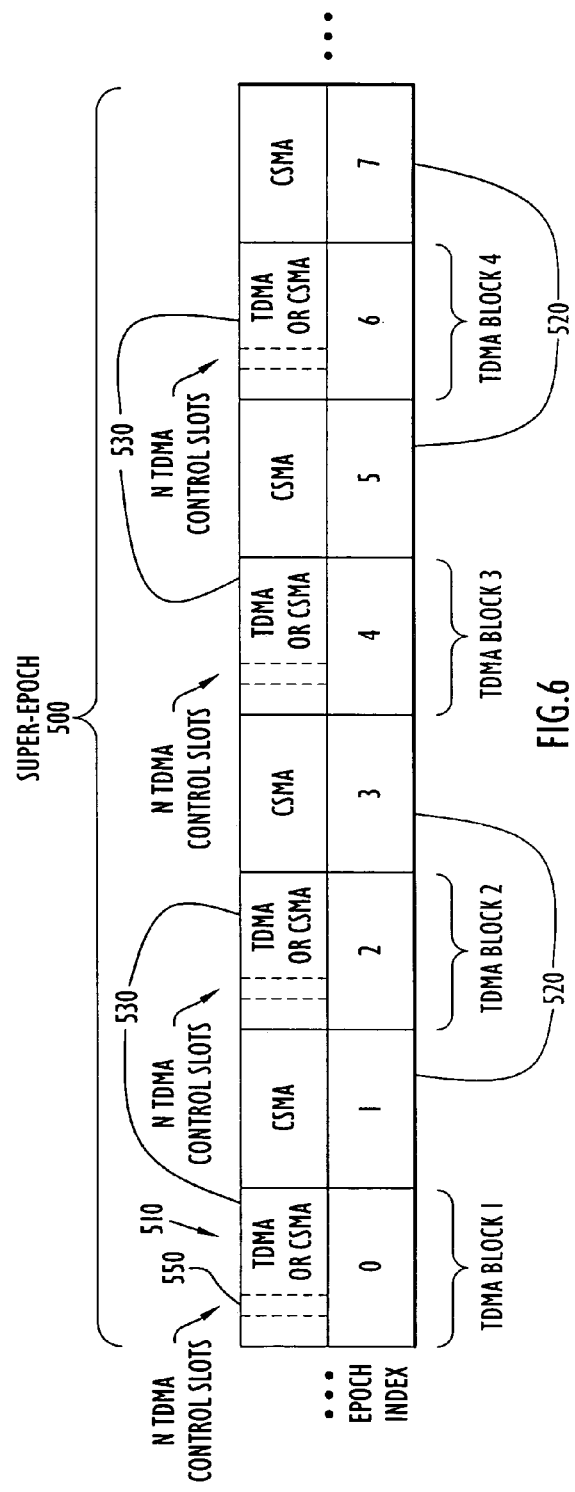

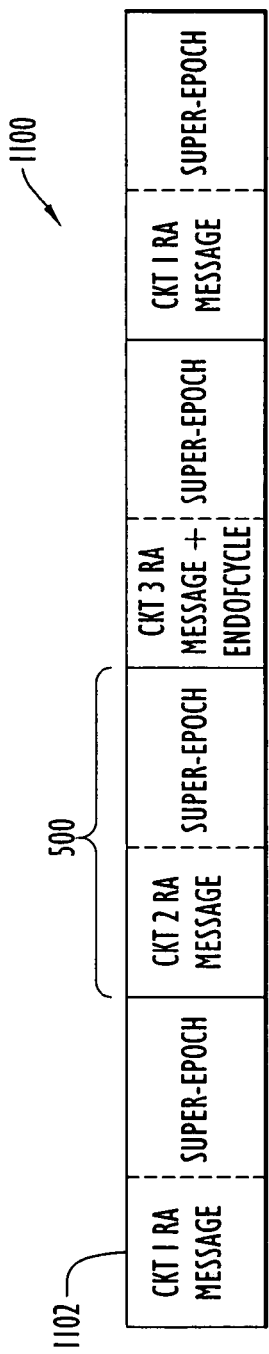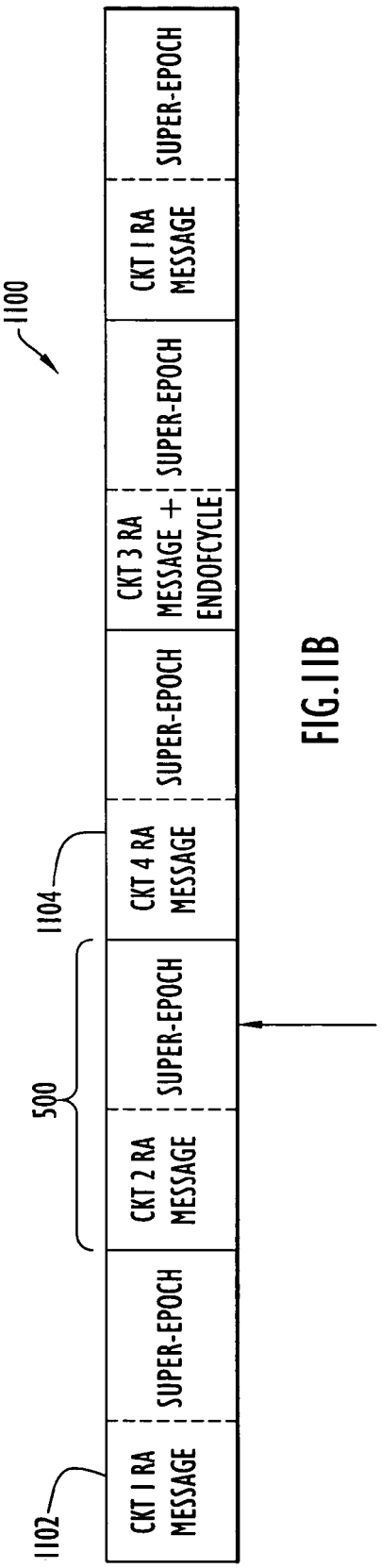
FIG.11A
FIG.11B

METHOD AND APPARATUS FOR DYNAMIC CHANNEL ACCESS WITHIN WIRELESS NETWORKS

STATEMENT REGARDING FEDERALLY SPONSORED RESEARCH OR DEVELOPMENT

The U.S. Government may have a paid-up license in this invention and the right in limited circumstances to require the patent owner to license others on reasonable terms as provided by the terms of Contract No. DAAB07-03-9-K601 awarded by CECOM.

BACKGROUND OF THE INVENTION

1. Technical Field

The present invention pertains to a protocol to support Quality of Service (QoS) for point-to-point transfer of image data in a mobile, Ad-Hoc, wireless network. In particular, the present invention pertains to a scheme for circuit establishment, maintenance and bandwidth reservation over IP networks that allows for transfer of deterministic or image data between any two mobile nodes within a self-forming network supporting integrated deterministic/non-deterministic traffic flows.

2. Discussion of the Related Art

Traditional cellular wireless network systems require fixed base stations that are interconnected by a wired infrastructure. Communication between mobile users, one hop away from a base station, relies on a wired communications network structure or backbone and fixed base stations. However, tactical communication systems require that armed forces and their mobile platforms be able to communicate and move about freely without the restrictions imposed by wired communication devices. Further, a communications system for coordinating tactical operations is required to operate in a distributed manner to avoid centralized control points that render the network vulnerable in the event of a failure.

In order to address the limitations of the cellular model, new applications have emerged, which allow multi-hop communication between remote users without relying on the fixed infrastructure. For example, a system developed for the Multimedia Mobile Wireless Network (MMWN) project transports multimedia traffic over mobile, Ad-Hoc tactical networks. MMWN is based on a hierarchical network architecture and uses a set of link and network layer algorithms to support distributed real-time multimedia applications in a mobile, Ad-Hoc network. The MMWN system is based on a link-state routing distribution mechanism.

MMWN has the following three components: clustering techniques, location management, and virtual circuit set-up and repair. The system constructs and maintains Elastic Virtual Circuits (EVC) to transport multimedia traffic. These circuits may include multiple branches to reach multiple call participants, are designed to adapt to node mobility, and allow for call participants to randomly leave and join the call throughout the lifetime of the circuit. Virtual circuits are formed on a hop-by-hop basis, where hop-by-hop routing is based on a distributed computation of the forwarding path. Each node along the circuit performs a Dijkstra calculation to determine the appropriate next hop. The circuits provide quality-of-service (QoS) routing, resource reservation and loop elimination in the presence of inconsistent routing information. These circuits further include a repair mechanism in case of node movement or failure. Maintenance and repair of the virtual circuit is based on link-state information and requires the transmission of control information.

A mobile, Ad-Hoc wireless network operates in a highly dynamic environment. Due to node mobility and multi-path and channel fading, routes and resource availability fluctuate rapidly at wireless nodes. State information used by traditional routing protocols is quickly rendered obsolete because the nodes move rapidly. Thus, routes frequently become disabled using traditional routing protocols and are continuously re-computed. This results in an interruption in data connection and a loss of quality at the application. Therefore, the QoS provisioning problem is significantly more challenging than in wired networks.

The virtual circuit set-up scheme described above may not be suitable in a highly dynamic, bandwidth restricted environment because of the time and bandwidth required in setting up and maintaining the virtual circuit. In order to set-up and maintain a virtual circuit and reserve resources, nodes along the circuit must transmit control messages issued by the source and sent toward the circuit participants. Circuit participants must respond to resource and route messages issued by the source and propagated along the circuit. In scenarios with rapidly changing topology, the time interval required for the circuit to adapt to a topological change may exceed the time interval over which changes occur and, hence, exceed the time interval in which the protocol can adapt to the changes. Subsequently, routing and resource reservation tables may not be able to converge. In a highly volatile situation, this hop-by-hop routing mechanism could lead to inefficient routes, excessive bandwidth consumption, and an inability to locate the circuit participants.

The circuit service of the present invention extends the principles of a cellular system to operate in a mobile, multi-hop Ad-Hoc environment. Multimedia applications (e.g., digital audio and video) have stringent QoS requirements due to the timeliness of the information. In traditional single hop cellular networks, nodes learn about resource allocations via a base station. The present invention extends this solution to the multi-hop, Ad-Hoc environment, where the bandwidth required to support circuits is reserved via a TDMA scheme. This guarantees the bandwidth for the real-time traffic.

The present invention differs from the MMWN approaches described above with respect to at least the resource reservation scheme, circuit signaling procedure, and dissemination of image packets through the network. The broadcast nature of a wireless medium provides opportunities for efficient dissemination of delay sensitive image packets. The present invention employs a TDMA reservation and broadcasting scheme. This type of scheme is not usually proposed for mobile, Ad-Hoc systems since the scheme is considered to consume excessive bandwidth. However, under highly mobile conditions, the omni-directional broadcast consumes minimal transmission resources at the transmitting node, incurs minimal delay for each hop, and is simple to implement. In the present invention scheme, repair or maintenance of a circuit requires minimal overhead.

Further, wireless medium access control (MAC) protocols may cause a network to collapse due to the congestion that can result from control overhead (e.g., request to send (RTS)/clear to send (CTS)/acknowledgement (ACK)), wasted capacity, and the retransmission of failed packets due to collisions, interference and blocking. A collision occurs when a node within range of a destination attempts to access a channel while receiving a packet. The RTS/CTS handshake can be very inefficient and the overhead associated with access schedules further decreases capacity. In order to avoid collapse of the networking communication system due to congestion, the broadcast and dynamic TDMA reservation approach of the present invention avoids the RTS/CTS overhead associated with the scheduled access protocols by eliminating the need for contention.

In a mobile and volatile environment of a tactical communication system, traditional routing schemes can breakdown due to an inability to track a destination and excessive bandwidth expended in the process. The present invention is suitable for a dynamic, volatile environment since routing of resource reservation information is not required.

SUMMARY OF THE INVENTION

The present invention protocol is designed to offer guaranteed Quality of Service (QoS) for a predetermined number of circuits in a highly dynamic, scalable network. This type of network includes those found in the tactical environment, such as the Non-Line of Sight Launch System (NLOS-LS). NLOS-LS forms part of an integrated communication system networking multiple force domains, including warriors, sensors, missiles and intelligent munitions. This communication system requires high information bandwidth and reliable Ad-Hoc networked wireless connections that adapt to changes in the environment resulting from mobility, weather conditions, complex terrain and enemy activity.

The present invention protocol employs a Time Division Multiple Access (TDMA) reservation scheme to transmit deterministic data (e.g., image data) to a destination, while utilizing a Carrier Sense Multiple Access/Collision Avoidance (CSMA/CA) contention scheme to support non-deterministic data traffic. The present invention protocol operates over a link-state based routing protocol that reliably floods routing and resource reservation information to the nodes in the network. The present invention is suitable for general networking applications that require QoS for multimedia traffic in a mobile, Ad-Hoc network.

Moreover, the present invention capitalizes on certain properties of a radio, such as a RAKE type receiver that sums up multiple, identical transmissions from multiple sources. Accordingly, simultaneous re-transmissions of resource and route reservation information by nodes within close proximity do not contend, but constructively interfere with each other, thereby reinforcing the strength and improving the range of the signal.

The above and still further features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 3 is a block diagram of an exemplary node of FIGS. 1-2.

FIG. 5 is a diagrammatic illustration of an exemplary TDMA/CSMA bandwidth allocation on a TDMA channel.

FIG. 6 is a diagrammatic illustration of exemplary slot allocations within TDMA blocks.

FIGS. 11A-11B are diagrammatic illustrations of an exemplary transmission cycle of a controller handling three and four active TDMA circuits, respectively, according to the present invention.

DETAILED DESCRIPTION OF THE PREFERRED EMBODIMENTS

The present invention provides point-to-point transfer of deterministic data (e.g., image data) in a network architecture, such as the Non-Line of Sight Launch System (NLOS-LS). However, the present invention may be applied to various types of networks. An exemplary network architecture that may be employed by the present invention is a multi-hop, wireless, Ad-Hoc network. This type of network does not include an infrastructure (e.g., there is no fixed base station as in a cellular network, where a single-hop environment of a cellular network becomes a special case) and may be utilized in a hostile network environment (e.g., a tactical battlefield, etc.) with unfriendly jamming.

Figure 1:
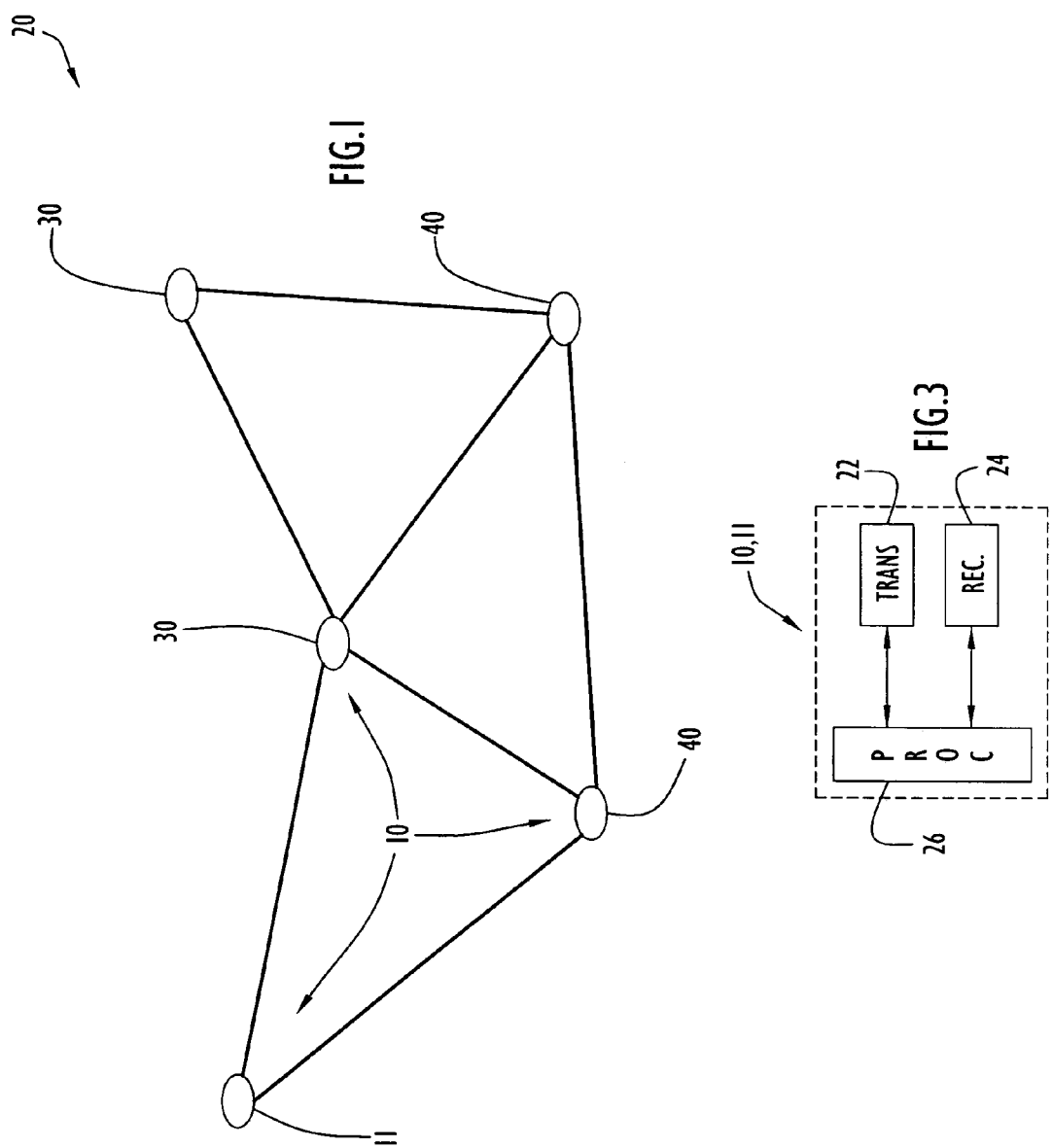
FIG. 1 is a diagrammatic illustration of network nodes according to the present invention arranged in an exemplary communication network.

An exemplary wireless Ad-Hoc network including network nodes according to the present invention is illustrated in FIG. 1. Specifically, wireless network 20 includes a plurality of nodes 10. The network is typically in the form of a flat, multi-hop network. A portion of network nodes 10 may serve as source nodes 30 providing image and other data, while other network nodes 10 may serve as destination nodes 40 to receive transmitted data from the source nodes. In addition, one of the network nodes 10, preferably a destination node 40, is designated as a controller node 11. The controller node allocates and releases TDMA resources for communication circuits between source and destination nodes as described below, where nodes 11, 30 and/or 40 may serve to relay traffic. The nodes may alternatively form a network of any quantity of tiers.

Figure 2:
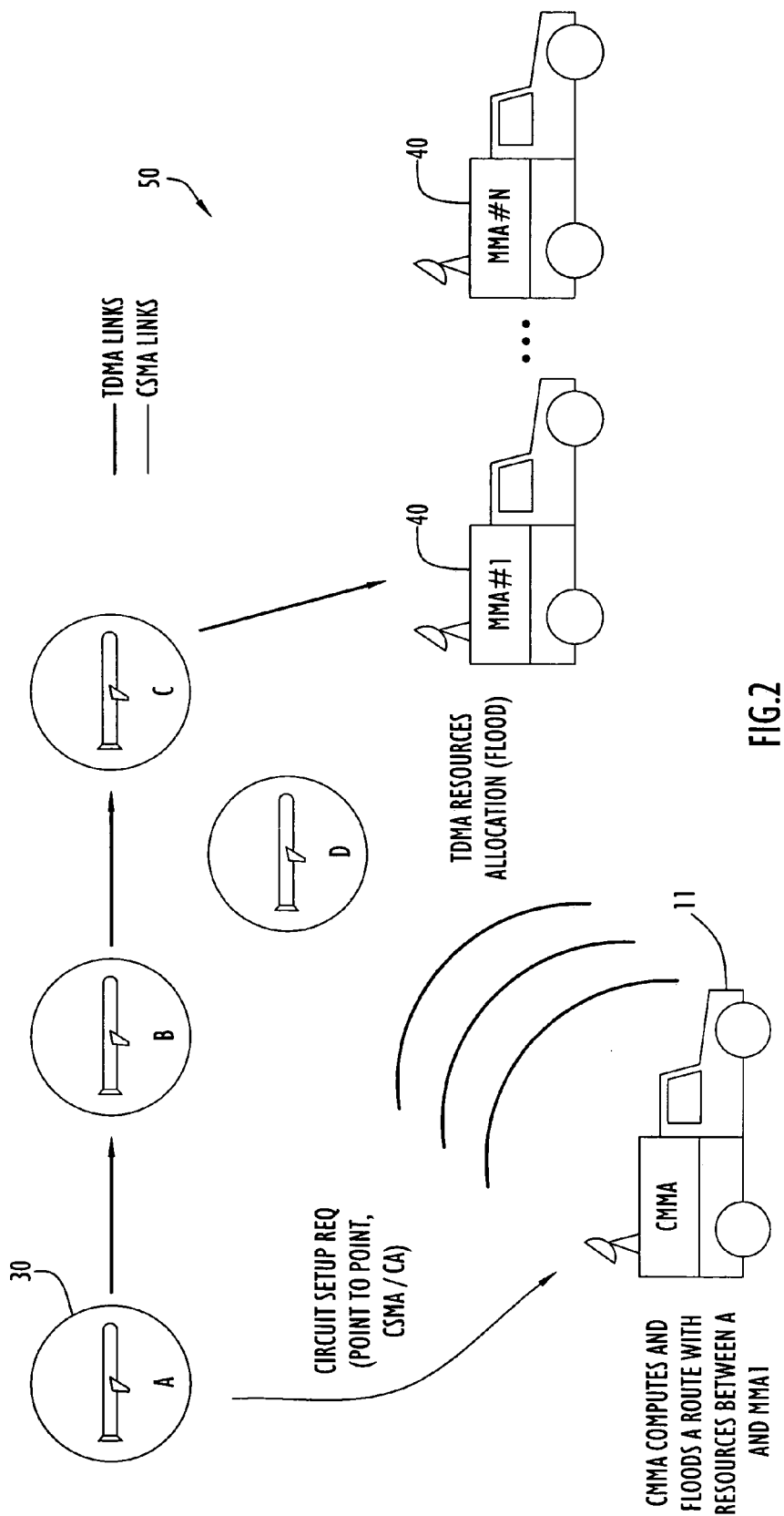
FIG. 2 is a diagrammatic illustration of an exemplary type of network employing the protocol of the present invention.

By way of example, the network may be implemented by an NLOS-LS type network as illustrated in FIG. 2. Specifically, network 50 includes a plurality of mobile source nodes 30 (e.g., in the form of missiles or unmanned aerial vehicles (UAV)) and destination nodes 40 (e.g., in the form of mission management application (MMA) nodes) with one of destination nodes 40 designated as a controller node 11 (e.g., a controller mission management application (CMMA) node).

Network 50 provides a high capacity data service to mobile source nodes 30. The source nodes generate and transmit image frames over the air to designated destination nodes 40, where nodes 11, 30 and/or 40 may serve to relay traffic. The image traffic is generally referred to as deterministic traffic since images are comprised of long messages sent at a known periodicity. Other traffic types within the network are generally referred to as non-deterministic and include relatively short messages with a frequency of occurrence that is random in nature. Non-deterministic traffic is sent using a CSMA/CA media access scheme since the random nature of occurrence precludes set-up of a dedicated TDMA circuit. Mobile source nodes 30 may utilize the dynamic TDMA scheme of the present invention for rapid delivery of time-deterministic image frames. For example, the present invention may support a 0.5 Mb compressed image generated once every two seconds; however, the present invention may be configured to support other traffic profiles, bandwidth and data rate requirements.

Controller node 11 (e.g., CMMA) is employed for resource allocation and route calculation for transmission of deterministic and non-deterministic data. The present invention protocol transmits deterministic data by setting up a TDMA circuit within the network for transfer of information. The circuit remains in existence during deterministic data flow. CSMA/CA is utilized for media access by set-up messages creating a TDMA high capacity circuit, and other types of application traffic and network control messages.

The present invention utilizes an Internet Protocol (IP) precedence field to distinguish between deterministic (e.g., TDMA) and non-deterministic (e.g., CSMA) traffic types (e.g., received from a host computer system or a flight computer with respect to an NLOS-LS network). Each TDMA circuit is assigned a precedence level based on the IP precedence of a data stream transported by that circuit. The present invention utilizes precedence to support preemption of data streams within a TDMA circuit and preemption of TDMA circuits within a network as described below. The network nodes transmit packets in IP precedence order, preempting low precedence data in favor of high precedence data. If a lack of resources within the network prevents establishment of a high precedence circuit, a lower precedence circuit is preempted in order to obtain resources for the higher precedence circuit.

A network node 10 according to the present invention is illustrated in FIG. 3. In general, each node 10 within the network includes an image channel including a Time Division Multiple Access (TDMA) frame architecture. Specifically, the communication portion of a node 10 includes a transmitter 22, a receiver 24 and a processor 26. The node may further include other components in accordance with a particular application (e.g., flight computer system in the case of a missile or aerial vehicle, etc.). The processor is preferably implemented by a conventional microprocessor or controller and controls the node to transmit and receive messages in accordance with the communication protocol described below. The transmitter is preferably implemented by a conventional transmitter and transmits messages from the processor, preferably in the form of radio frequency (RF) signals, in accordance with processor instructions. Receiver 24 is typically implemented by a conventional receiver and configured to receive signals, preferably in the form of radio frequency (RF) signals, transmitted by the transmitter of another node. The receiver forwards the received signals to processor 26 for processing and is preferably in the form of a conventional RAKE type receiver to enable flooding of information with enhanced signal strength as described below. The node further includes an identification (ID) (e.g., a code or identification number) to identify the particular node and a database (not shown) to store information pertaining to neighboring nodes to facilitate reservations and/or routing. The identifier is unique to each node and preferably pre-assigned (e.g., a serial number or an identification number). Controller node 11 is substantially similar to node 10 described above. The controller node has additional responsibilities including resource management, route calculation and other protocol related functions as described below.

The network preferably employs a link-state type of routing protocol. The database of each node 10 (e.g., and, hence, nodes 11, 30, 40) maintains information enabling that node to determine appropriate paths for routing messages through the network. The information typically relates to links between the various network nodes. The node databases are synchronized in accordance with the routing protocol by transference of database update packets or messages (e.g., link state advertisements (LSAs)) between nodes that provide network connectivity information. In addition, each node periodically broadcasts a beacon type or neighbor discovery packet. This packet advertises the presence of a node within the network and is typically utilized by nodes for "keep alive" and neighbor discovery purposes as described below.

The present invention provides TDMA route calculation and resource allocation in a centralized manner. A controller node (e.g., node 11 in FIGS. 1-2) is selected from among the destination network nodes (e.g., nodes 40 in FIGS. 1-2). The primary function of the controller node is to manage resource allocation and route calculations for TDMA circuits, preferably using a Shortest Path First (SPF) approach. Network nodes learn of the controller node identification from a resource allocation message transmitted in TDMA overhead slots in a TDMA block as described below.

Figure 4:
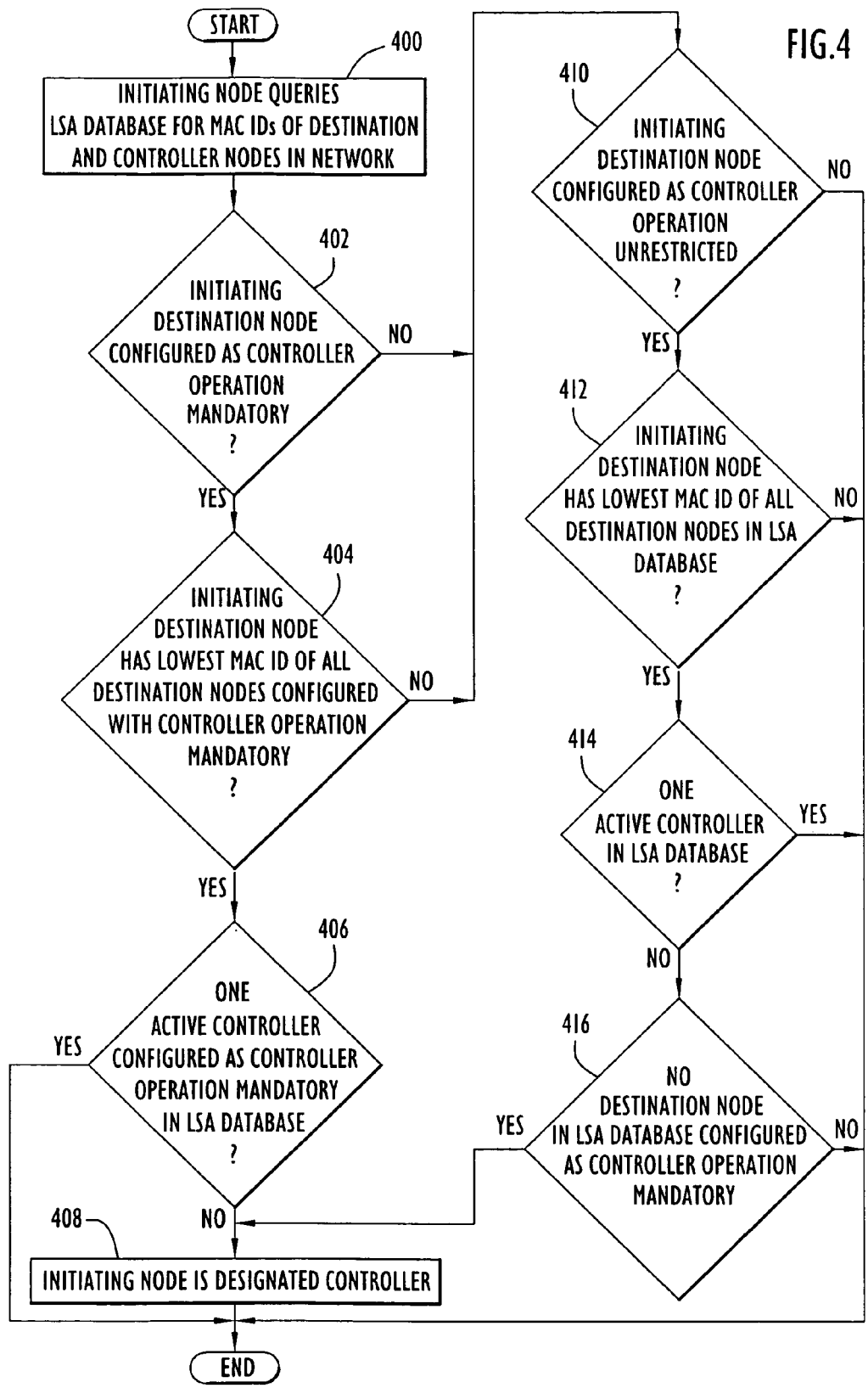
FIG. 4 is a procedural flow chart illustrating the manner in which a controller node is selected according to the present invention.

The manner in which a node is selected as a controller node is illustrated in FIG. 4. Initially, each network includes a controller node 11 (FIGS. 1-2) to manage resource and route assignments for TDMA operation. A network node may be statically configured or dynamically selected to serve as the controller node for the network. A node can be configured as Controller Operation Mandatory, Controller Operation Prohibited, or Controller Operation Unrestricted. If a node is configured as Controller Operation Mandatory, the node is required to act as the controller node of the network (e.g., regardless of a Medium Access Control identification (MAC ID) or address of the node within the network), unless two or more nodes are erroneously configured as Controller Operation Mandatory as described below.

When a node is configured as Controller Operation Prohibited, the node cannot assume the role of the controller under any circumstance. If the node is configured as Controller Operation Unrestricted, the node may be selected to serve as the controller, depending upon the particular network conditions as described below. In particular, the destination nodes (e.g., nodes 40 in FIGS. 1-2) initialize at network start-up. The destination nodes are in a neighbor discovery mode and transition to a link maintenance mode after establishing bi-directional communication and exchanging link state databases with one or more neighboring nodes. The destination nodes issue a Link State Advertisement (LSA) with the node role and configuration setting and starts a controller selection timer. When the controller selection timer expires, a controller selection protocol commences.

A destination node cannot select itself to be the controller node while the controller selection timer is running. The purpose of the timer is to allow enough time for the network to form and the Link State Advertisements (LSAs) to be distributed so that the destination nodes of the network can learn about each other before controller selection is performed.

The controller node selection process is initiated via the controller selection timer on start-up or in response to occurrence of events. In particular, the selection process commences upon receipt of a Link State Advertisement (LSA) by a node from a controller node that is different from a current controller node. The actions taken by the receiving node depend upon the status of that node (e.g., destination or controller node) and the results of an LSA database query. This enables resolution of controller conflicts that may arise from fragmented networks or other causes that result in more than one controller. Further, controller selection commences in response to an indication that connectivity to a previous controller node has been lost (e.g., a predetermined number of successive super-epochs (containing TDMA timeslots as described below for FIGS. 5-6) pass in which no resource allocation message is received). The mobile (radio) router and control (MRC) module tracks the super-epoch count. A destination node expects to receive a minimum of one resource allocation packet in each super-epoch. If by the end of a super-epoch, a destination node has not received a resource allocation message, the node increments a controller inactive counter. Each destination node (except for the controller node) maintains this counter. Upon receipt of a resource allocation message, the node initializes the counter. When the counter exceeds a configured maximum value, the node begins the controller selection process. The counter threshold value for the destination nodes should be less than the value set for all non-destination nodes to enable reselection to occur before detection of a lost controller by a non-destination node.

Specifically, the destination node initiating the controller selection process initially queries the LSA database for the MAC ID of any destination and controller nodes in the network at step 400. The initiating destination node maintains the internal resource configuration set by a previous resource allocation message or due to a start-up configuration until the node selects itself to be the controller or a new resource allocation message is received. The initiating node designates itself to be the controller node at step 408 in response to determining that: the initiating node is configured as Controller Operation Mandatory at step 402; the initiating node has the lowest MAC ID of all nodes in the LSA database that are configured as Controller Operation Mandatory at step 404; and the LSA database does not have exactly one active controller which is configured as Controller Operation Mandatory at step 406. If only one active controller exists, the active controller remains the controller.

Further, the initiating node can designate itself to be the controller when configured as Controller Operation Unrestricted. In particular, the originating node designates itself to be the controller node at step 408 in response to determining that: the initiating node is configured as Controller Operation Unrestricted at step 410; the initiating node has the lowest MAC ID of the destination nodes in the LSA database at step 412; the LSA database does not have exactly one active controller at step 414; and none of the destination nodes found in the LSA database are configured as Controller Operation Mandatory at step 416. When only one active controller exists, the controller remains as the controller node as described above.

When the initiating node selects (or deselects) itself as the controller, an LSA message is flooded with the new role (e.g., controller or NOT controller) and configuration status (e.g., Controller Operation Unrestricted or Controller Operation Mandatory). If the new, self-selected controller node has already received a resource allocation packet from a former controller node, the new controller node maintains active TDMA circuits.

If a resource allocation packet arrives while the controller selection timer is running (e.g., indicating a controller already exists), the initiating node processes the packet, continues running the controller selection timer and maintains the resource allocation data. When the initiating node becomes the new controller, the new controller has information to maintain active TDMA circuits. Since the new controller has no knowledge of pending TDMA circuits, originators of those pending circuits re-initiate the circuit set-up process upon discovering the new controller. The controller further generates a null resource allocation packet, or one or more resource allocation packets for each active circuit for flooding.

Once a controller node has been selected, the controller node remains the controller as long as the node remains a destination node in the network. A new destination node joining the network with a lower MAC ID than the current controller node does not replace the current controller node. However, if the new node is configured as Controller Operation Mandatory and the current controller is configured as Controller Operation Unrestricted, the new node becomes the controller node.

A combination of time block and TDMA frequency channel resources are utilized to allocate TDMA bandwidth. Although a particular TDMA frequency channel can be assigned to only one pair of communicating nodes during any given time block, multiple pairs of communicating nodes may each be assigned different frequency channels to enable simultaneous transmissions within that block. The communicating node pairs and frequency channels generally change with each time block within a super-epoch as described below.

Time blocks are allocated on an epoch basis. Preferably, odd numbered time blocks are used for CSMA transmissions, while even numbered time blocks are used for TDMA operation. However, the TDMA time blocks may be available for CSMA operation, if not required to transmit TDMA image data. The assignment of time blocks to epochs may alternatively be accomplished by various conventional techniques depending upon traffic requirements. The time blocks default to TDMA operation in order to prevent interference on point-to-point channels (CSMA/CA) and TDMA logic channels that are mapped to the same logical frequency. Therefore, if two nodes exchanging a non-deterministic message are not performing TDMA transfers during a particular TDMA epoch, the nodes can perform a CSMA transfer on a point-to-point frequency channel during that time (e.g., unless the frequency channel is mapped to the same frequency as a TDMA frequency in a TDMA time block). CSMA transfers use the CSMA frequency channels, regardless of the time block during which the data is transmitted (e.g., CSMA uses one reservation channel, one broadcast channel, and one or more point-to-point data channels). When a TDMA circuit is terminated, the network releases the time blocks and frequency channels allocated to that circuit, where those resources become available for CSMA/CA traffic.

An exemplary time block allocation scheme that may support both TDMA and CSMA/CA operation on a TDMA channel is illustrated in FIG. 5. Time on the TDMA channels is divided into contiguous "super-epochs." A super-epoch 500 includes a configurable number of consecutive epochs 510 (e.g., the default value is preferably set to eight epochs each numbered zero through seven as shown in FIG. 5). Each epoch has a predetermined number of consecutive slots. Epoch usage within a super-epoch alternates between CSMA/CA and TDMA channel access schemes as described above. Odd-indexed epochs 520 are utilized for CMSA/CA transmissions, while even-indexed epochs 530 are utilized for TDMA transmissions. Thus, a minimum of fifty percent of the system bandwidth is allocated to CSMA/CA traffic.

Even-indexed epochs 530 within super-epoch 510 are generally referred to as TDMA blocks and may be dynamically assigned and unassigned to TDMA circuits. The number of TDMA circuits that can be supported on a TDMA channel depends on the number of links between the originating or source node and the destination node of each circuit. For example, there are four TDMA blocks in each super-epoch (FIG. 5). Since each link of a multi-hop transmission uses a time block (e.g., epoch), and since the TDMA time block pattern repeats with each super-epoch, the TDMA design can provide end-to-end connectivity between nodes that are up to four hops apart. Nodes that are greater than four hops apart can be handled by spatial reuse of the frequency channel, where multiple pairs within the circuit are assigned the same time block and frequency channel since the pairs communicate simultaneously without interfering with one another.

TDMA route and resource calculations are centralized at controller node 11 (e.g., FIGS. 1-2) as described above. The controller node makes unique assignments (e.g., TDMA block number, frequency channel, etc.) for each link in each TDMA circuit. Each TDMA block carries data on an assigned TDMA frequency channel for a particular link in a single TDMA circuit.

TDMA control information is distributed (e.g., broadcast) across the network by a bandwidth-efficient TDMA flooding scheme. A configurable number (N) of slots within each TDMA block are permanently dedicated to the flooding of network control traffic. These slots are never released for CSMA/CA activity, even if a TDMA block is not assigned to a TDMA circuit.

The nodes of the network transmit/receive a broadcast message on a specific TDMA RF channel. The first N slots of each TDMA block (e.g., even-indexed epochs 0, 2, 4, and 6 of each super-epoch as illustrated in FIG. 5) are permanently reserved for flooding of the resource allocation control packet. The remaining slots in the TDMA block are used for transmitting either TDMA image data or CSMA/CA data.

The TDMA blocks within a super-epoch in which flooding occurs is illustrated in FIG. 6. Initially, the flooding scheme allows nodes within four physical hops of the controller to receive the resource allocation/deallocation packet. The controller floods the resource allocation/deallocation packet at the beginning of each super-epoch 500 (e.g., block one (epoch zero) resource allocation slots as illustrated in FIG. 6). If no circuits are active, a null resource allocation packet is flooded. The resource packet is received by each node in permanent control slots 550 assigned to TDMA control data as described above. The resource allocation packet is processed and simultaneously echoed in the control slots belonging to the next TDMA block (e.g., except for the last block). Relying upon a characteristic of a RAKE receiver in which multiple identical transmissions from multiple sources are summed, simultaneous re-transmissions of an identical packet by nodes within close proximity do not contend, but constructively interfere with each other. In fact, re-transmission of the packet is time synchronized to ensure packets from multiple sources at a given destination are received within the multi-path window of the RAKE receiver. As a result, the signal strength and signal range are improved.

Figure 7:
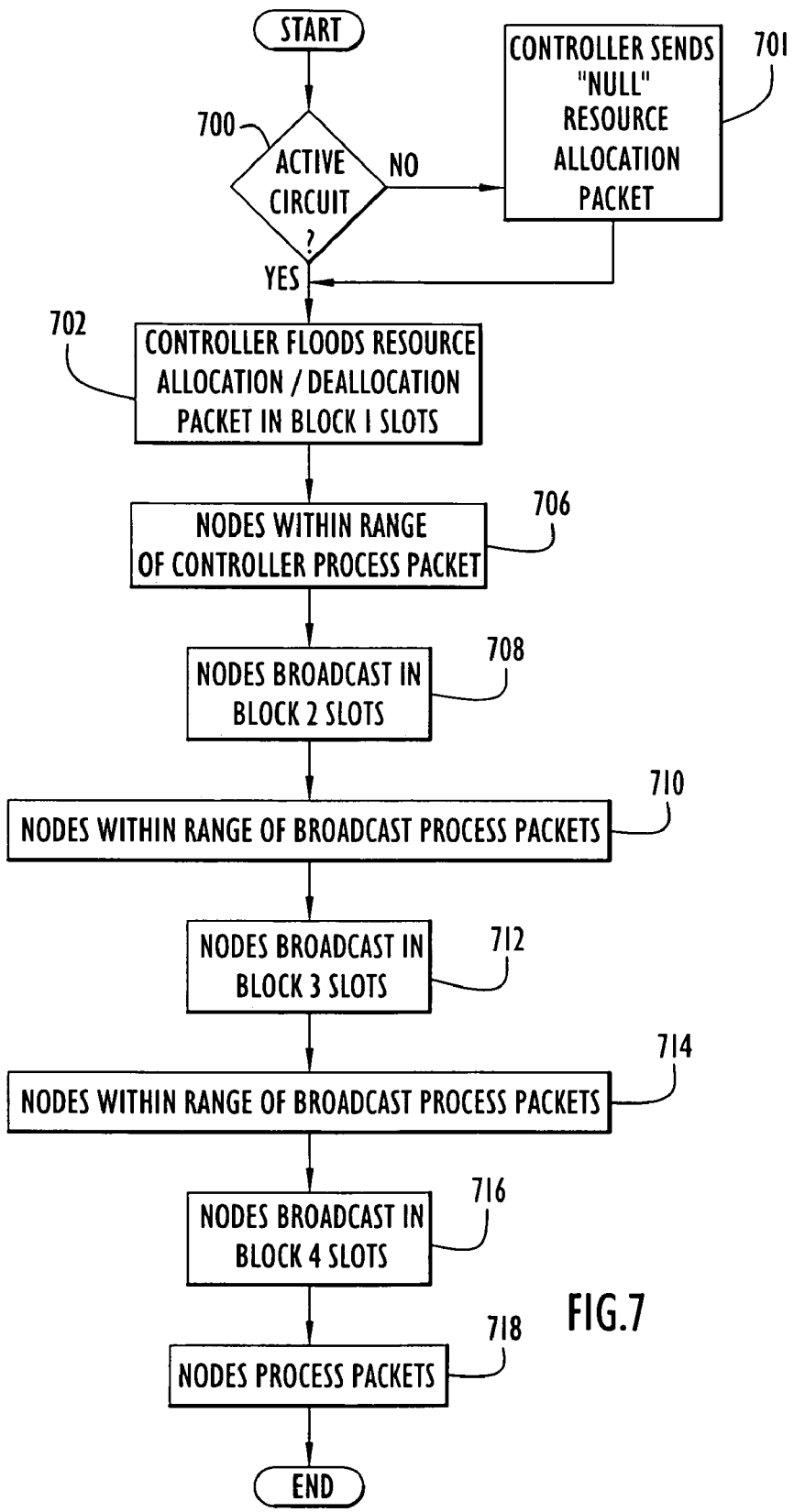
FIG. 7 is a procedural flow chart illustrating the manner in which resource allocation/deallocation packets are flooded within a network according to the present invention.

The manner in which a resource allocation/deallocation packet is flooded is illustrated in FIG. 7. In particular, if no TDMA circuits are active as determined at step 700, the controller floods a null resource allocation packet at step 701. Otherwise, a controller node 11 (e.g., FIGS. 1-2) floods a resource allocation/deallocation packet at the beginning of each super-epoch (e.g., in the block one resource allocation slots (epoch zero of each super-epoch)) at step 702. The resource allocation slots in each block are the reserved (permanent) TDMA control slots as described above (FIG. 6). The nodes within range of the controller process the transmitted packet at step 706 and echo the broadcast in block two (epoch two) resource allocation slots at step 708. The nodes that hear the broadcast in block two process the packet at step 710 and echo the broadcast in block three (epoch four) resource allocation slots at step 712. The nodes that hear the broadcast in block three process the packet at step 714 and echo the broadcast in block four (epoch six) resource allocation slots at step 716. The nodes that hear the broadcast in block four process the packet at step 718 since there are no more remaining TDMA blocks (e.g., based on the exemplary architecture of FIG. 6) in the super-epoch to broadcast the packet. The above flooding process handles nodes within four hops of the controller. However, the flooding process may be modified for any desired quantity of hops.

If a node hears the same resource allocation/deallocation packet more than once in a super-epoch, the node ignores all but the first reception to avoid re-broadcasting a message that has already been echoed. The controller that generates the resource allocation/deallocation packet processes the information in the packet in substantially the same manner as a destination node in the network that receives the packet in a transmission.

Each traffic stream has an Internet Protocol (IP) precedence field as described above. The IP precedence field is a precedence or priority level assigned based on the data traffic. Thus, each TDMA circuit is assigned a precedence level based on the IP precedence of the data stream being transported. The network uses the IP precedence field to distinguish between deterministic or image (TDMA) and non-deterministic (CSMA) traffic types. The network utilizes precedence to support preemption of data streams within a given TDMA circuit and preemption of TDMA circuits within the network. A network node transmits and processes packets in IP precedence order, preempting lower precedence data in favor of higher precedence data. If a higher precedence circuit is prevented from being established due to a lack of resources, a lower precedence circuit is preempted in order to obtain the required resources for the desired circuit.

Figure 8:
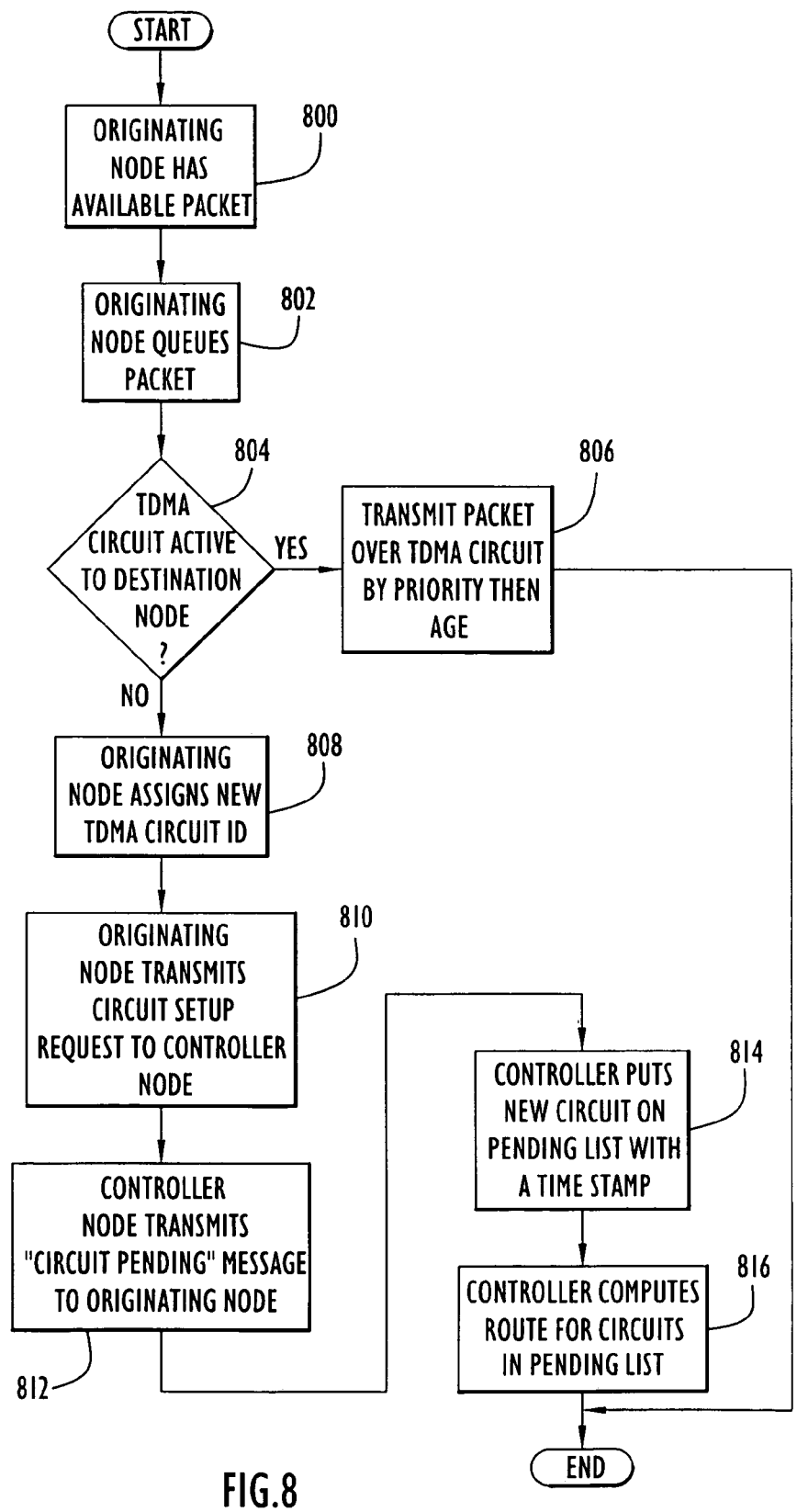
FIG. 8 is a procedural flow chart illustrating the manner in which a circuit is established according to the present invention.

Using resources and protocols, the controller node creates a TDMA circuit in the network. Generally, upon receipt of a TDMA circuit set-up request from a network node, the controller node attempts to determine a route with sufficient resources to support the requested TDMA circuit between the originating or source node and a designated destination node 40 (FIGS. 1-2). If the controller node is unsuccessful, the controller node attempts to preempt a lower precedence circuit in favor of the higher precedence circuit. The manner in which a TDMA circuit is established is illustrated in FIG. 8. Specifically, an IP packet (e.g., from a host system, such as a flight computer system, etc.) is available for transmission at an originator or source node at step 800. The packet includes a precedence level that indicates a deterministic or image transmission. The originator node queues the packet at step 802. If an active TDMA circuit from the originator node to the designated destination exists as determined at step 804, the originator node transmits the packet over the existing TDMA circuit (e.g., as viewed in FIG. 2) in accordance with data precedence or priority level and age at step 806. If an active TDMA circuit from the originator node to the designated destination does not exist, the originating node assigns a new TDMA circuit identification (circuit ID) at step 808 and transmits a circuit set-up request to the controller node at step 810 using CSMA/CA (e.g., as viewed in FIG. 2). The originating node can only receive confirmation of the requested circuit status (e.g., "active" via receipt of a TDMA resource allocation message from the controller or "pending" via receipt of a CSMA/CA circuit pending message from the controller). A resource allocation packet includes the status and pertinent information of an active circuit.

The originating node needs a recorded controller MAC ID in order to perform circuit set-up. The MAC ID is periodically sent from the controller node in a resource allocation message (e.g., as viewed in FIG. 2). If there is no MAC ID recorded, the originating node cannot request a TDMA circuit, and no TDMA circuit is established. When the originating node detects a change in the controller MAC ID (e.g., via receipt of a resource allocation/deallocation message or a CSMA/CA message from the controller node), the node re-sends the circuit set-up request for a circuit in a set-up or pending state.

Upon receiving a circuit set-up request, the controller node transmits a CSMA/CA circuit pending message to the originating node at step 812, and places the new circuit on a pending list with a time stamp indicating when the new circuit request arrived at step 814. The controller attempts to compute a route with resources for all circuits in the pending list at step 816. The circuits are processed according to priority and age (e.g., beginning with the circuit of highest priority and greatest age). Any quantity of circuits may be activated when the controller node processes the pending list.

The controller node utilizes various lists and tables to compute routes for circuit set-up. In particular, the tables and lists include a TDMA pending circuit list, a TDMA active circuit list, a block allocation table, and a channel allocation table. The TDMA pending circuit list is a list of the pending TDMA circuit requests for which sufficient resources do not exist. This list is maintained by the controller node and used for the preemption process described below. The list is ordered by precedence and then by age (e.g., the time a request arrived). A pending list timer is a continuous timer with a configurable expiration value. Each time the pending list timer expires, the timer is restarted and the circuit requests in the TDMA pending list are processed as if the requests had just been received. When a new circuit request is received or an active circuit is terminated, the pending list timer is stopped, the circuit requests in the list are processed and the timer is restarted. Circuit requests are handled via a resource allocation process and preemption as described below. If a circuit request can be satisfied, the request is removed from the pending list and the circuit is created.

The TDMA active circuit list is a list of the currently operational TDMA circuits. This list is used by the preemption process described below and is arranged based on destination and then by precedence. A resource allocation message transmitted in the TDMA overhead slots includes information within an entry of the TDMA active circuit list. The entry includes pertinent information associated with a single active circuit.

Entries in the TDMA active circuit list can be removed by the disappearance of either end point of the circuit (e.g., the originating or destination node) or by receipt of a circuit termination message from a circuit participant. If an entry is removed, the associated resources are released and the block allocation and channel allocation tables are updated accordingly.

The TDMA block allocation table includes the current block and channel assignments for each active circuit. This table is used to construct the TDMA control resource allocation message that is sent by the controller node to the nodes in the network. The network nodes use the information in the resource allocation message to configure resource usage and to discover participation in TDMA circuits. Upon receiving the resource allocation message, each node determines the presence of changes in the TDMA block allocation table. If changes are present, the node reconfigures the TDMA time block usage. The resource allocation message is transmitted in the TDMA overhead slots as described above.

The TDMA block allocation table contains an entry for each node in the network. An entry may support up to two active circuits. The number of active circuits supported by an entry is configurable. Each entry includes at least the identification of the node being described and block subentries each representing one of the TDMA blocks in a super-epoch (e.g., four subentries for four TDMA blocks as viewed in FIG. 5).

The TDMA channel allocation table includes the current frequency channel assignments for each active circuit to ensure that no frequency is used more than once for a given TDMA block. Each entry is associated with an available TDMA frequency channel. A circuit may use the same frequency channel in each of its TDMA blocks, a different frequency channel in each block, or any combinations thereof based on the manner resources are allocated. Each entry includes at least one field for each of the possible TDMA blocks in the super-epoch. Each field includes the identification of the circuit assigned to the frequency channel for the corresponding TDMA block. If a frequency channel is not being used on each block, some of the table entries are empty.

As discussed above, a controller node places a new circuit request on the pending list, stops and re-starts the pending list timer and evaluates the pending list for circuit creations in response to receipt of the new request. The list evaluation is performed to prevent a new request from obtaining resources that may be utilized by a higher priority request already residing in the pending list. The controller attempts to fulfill new requests for TDMA circuits in order on the pending list (e.g., by precedence and age). If a circuit request cannot be fulfilled immediately, the request remains in the list. However, when a circuit request is fulfilled, the TDMA block allocation table and the TDMA channel allocation table are updated. The controller node generates and transmits a new resource allocation message for the newly activated circuit.

The controller node attempts to compute the shortest route from the originating node to the destination. Initially, nodes without adequate resources are eliminated from the circuit determination. A shortest path first (SPF) technique is applied to the remaining nodes and corresponding adjacencies or neighbors to determine an optimum path. If a path is available, resources are allocated (e.g., blocks and frequency channels) and the TDMA block allocation table is updated to reflect that a circuit is created. If resources cannot be allocated, the path is modified and an attempt to find an alternative path is made. If no alternative path can be determined, preemption of existing circuits is considered. In particular, circuit availability is determined by initially determining the shortest route from the source to the destination. Resources (e.g., blocks and frequency channels) are assigned to the selected path. If the resource allocation fails, the shortest path first technique is re-applied and resource allocation is attempted on the new path. This process continues until either a satisfactory path is determined, or no further shortest path first candidate paths are available.

Once the shortest path first technique has computed a path, the path is checked to ensure that TDMA time blocks and TDMA frequency channels can be assigned to each link on that path. In the exemplary network (FIG. 2), there is no frequency reuse. In other words, for each TDMA time block, a TDMA frequency channel may be assigned to only one TDMA link and cannot be used as part of any other TDMA circuit during the time block assigned to the local TDMA circuit. However, the frequency channel may be re-used for various circuits based on the routing algorithm and network employed.

The resource allocation process examines all combinations of available TDMA blocks and frequency channels for each link on the computed shortest path first path until either a valid circuit can be established or the path is found unusable. If the path is found to be unusable, the path selection technique is informed and a new path is computed. The present invention may employ any conventional or other routing and/ or resource allocation processes to determine paths and resources.

Figure 9:
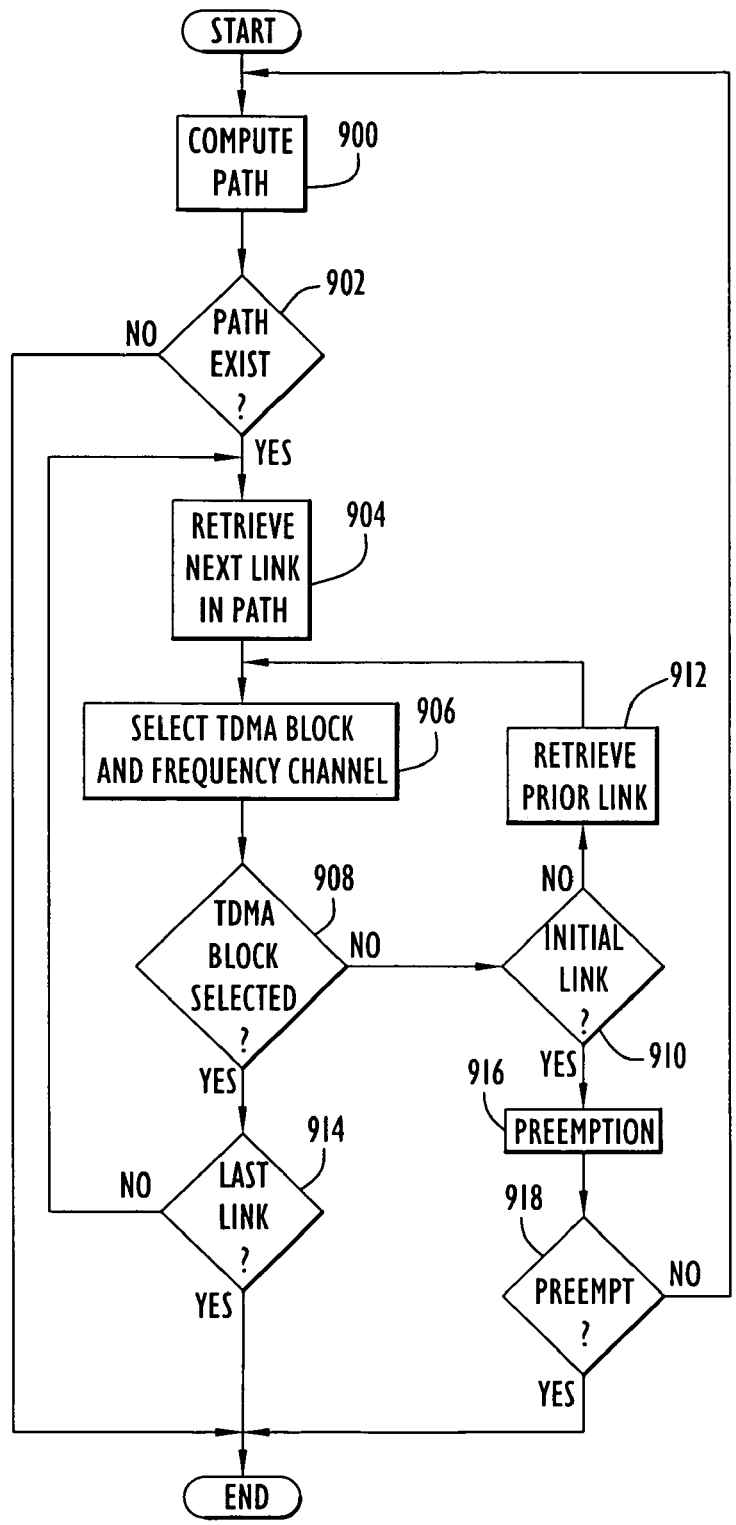
FIG. 9 is a procedural flow chart illustrating the manner in which a circuit is determined between network nodes according to the present invention.

An exemplary manner in which the controller determines a path and corresponding resources for a TDMA circuit is illustrated in FIG. 9. Initially, a shortest path is determined between source and destination nodes at step 900. If a path exists as determined at step 902, the initial or next node or link in the determined path is retrieved for resource allocation at step 904. The resource allocation searches from the first time block in successive order to determine a valid TDMA time block. In general, when selecting a common TDMA time block between a node and the next entry in the node list along the determined path, the lowest numbered common available time block is preferably selected from the TDMA block allocation table. In order to minimize delay, the remaining links along the path are preferably assigned to the nearest following time block excluding the time block assigned to the previous link (e.g., wrapping around from the last to the first time blocks, if necessary).

For descriptive purposes, node N refers to the node within the determined path currently being processed, node N−1 refers to the previous node in the determined path, node N+1 refers to the next node along the determined path and T refers to the number of the valid time block discovered by the search. In order to minimize latency, the next link time blocks are searched starting from the following time block, wrapping around from the last to the first time block, if necessary. The starting time block for selection is repeated at each of the following links.

The time block for the current node or link is selected at step 906. In particular, the first encountered time block is selected for which: the nodes N and N+1 both have this time block available; there is an available frequency channel that can be assigned to this time block; and the time block is not being used by nodes N and N−1. Basically, the highest common block available in the TDMA block allocation table between the originating node and the next entry in the node list or path is selected using the TDMA channel allocation table that maintains channel assignments to TDMA blocks. If the selected TDMA block has an available channel in the TDMA channel allocation table and the time block is not the same time block assigned in the previous link, the allocation to the current link for node N is a success and the next entry, N+1, along the path is processed. The time blocks are different to avoid a conflict in which a node receives on the previous link and transmits on the current link at the same time. When N is the originating node, the prior (N−1) node does not exist and this criterion is bypassed. If the selected TDMA block for link N does not have an available channel, or the same TDMA block has been assigned in the previous link, N−1, the next available TDMA block for link N is selected and the process repeats until a valid TDMA block and channel are found. When the above conditions are satisfied, a valid time block has been found. The selected frequency channel is marked as being in use for this time block. If a time block is selected as determined at step 908, the next link on the path is retrieved for processing at step 904. If the next node (N+1) is the destination as determined at step 914, the circuit is complete and resource allocation is successful. The TDMA channel allocation table and the TDMA block allocation table are updated accordingly. The new circuit is entered into the TDMA active circuit list. The preemption process uses this list to determine the blocks and channels that are available, if a circuit is released. If the N+1 entry in the node list is not the destination, the above process repeats until the path is complete as determined at step 914.

If a valid time block cannot be determined for node, N, to the next node, N+1, as determined at step 908, the previous node, N−1, within the path, for which a time block has been determined is retrieved at step 912 for time block selection at step 906 as described above. The currently selected frequency channel and TDMA time block of node N−1 is released and the process continues with the next valid TDMA block of node N−1. If the next valid block exists for node N−1, as determined at step 908, the next node (node N) is retrieved for re-processing at steps 904, 906.

If a valid block does not exist for node N−1, the previous link or node N−2 within the determined path is retrieved for processing and the process is repeated as described above. If there is a return to the first node (e.g., the originating node) within the path and valid block cannot be selected as determined at steps 908, 910, the resource allocation has failed after examination of the combinations of available TDMA blocks for the links in the computed path and preemption of an existing circuit is considered at step 916. If preemption is not successful as determined at step 918, a new path is determined at step 900 for processing as described above.

The circuit preemption process uses the TDMA block allocation table, the TDMA channel allocation table, and the TDMA active circuit list. A circuit request includes a source, a destination, and a precedence type. An existing circuit may be preempted if its precedence is less than that of the circuit requested. The preemption process attempts to construct the requested circuit by removing existing circuits that have a lower precedence than the requested circuit. A candidate for circuit preemption is evaluated by making available its blocks and channels and performing the above circuit determination. If a circuit is obtained, the previous circuit is preempted and is deleted. If the preemption fails, then the next preemption candidate is selected. The process is repeated until the remaining candidates are exhausted. If the complete preemption process fails, the circuit request is placed in the TDMA pending list. By way of example only, no more than one existing circuit is preempted in an attempt to establish a higher precedence circuit; however, any quantity of suitable circuits may be preempted.

Figure 10A:
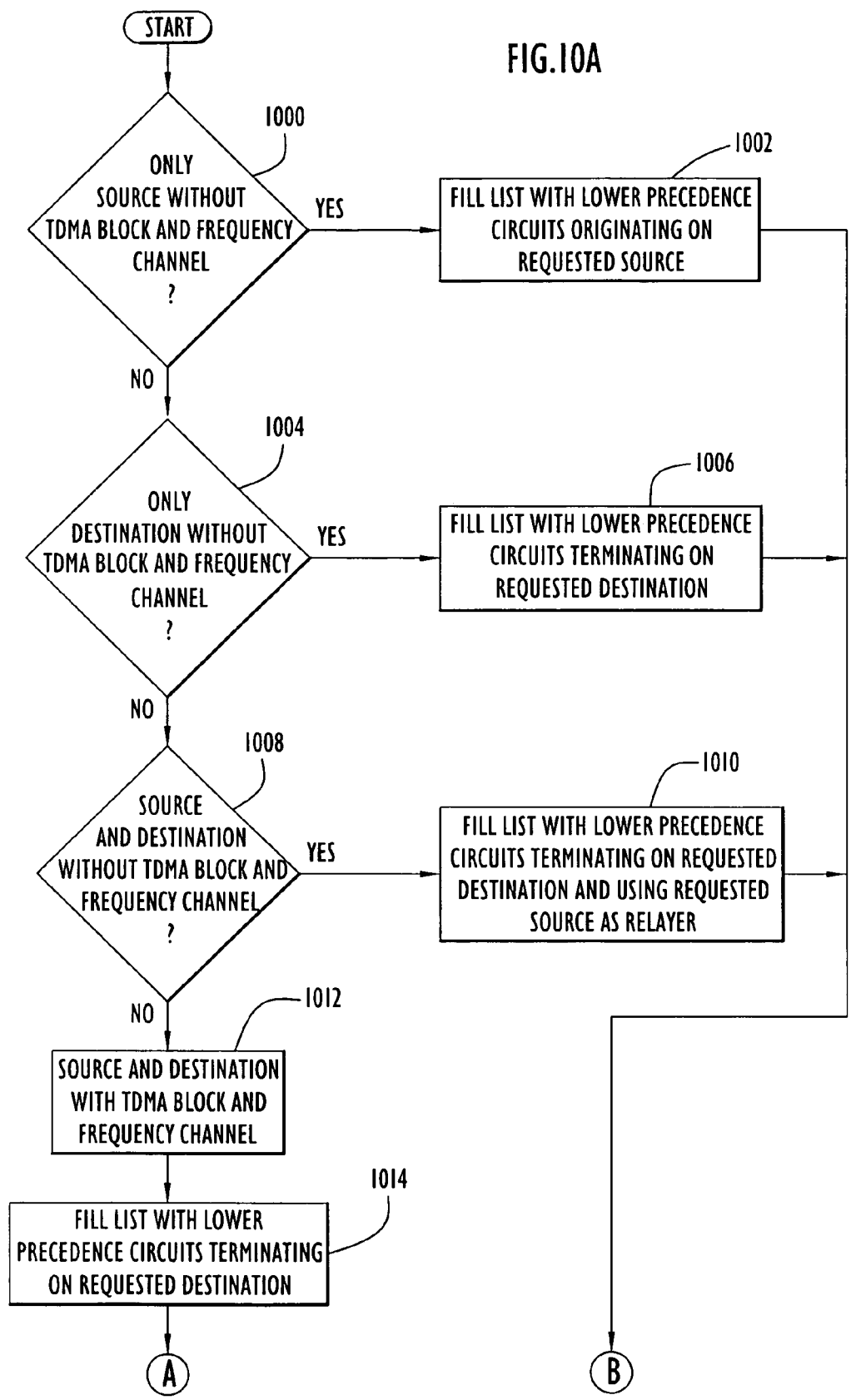
FIGS. 10A-10B are a procedural flow chart illustrating the manner in which a circuit is preempted according to the present invention.
Figure 10B:
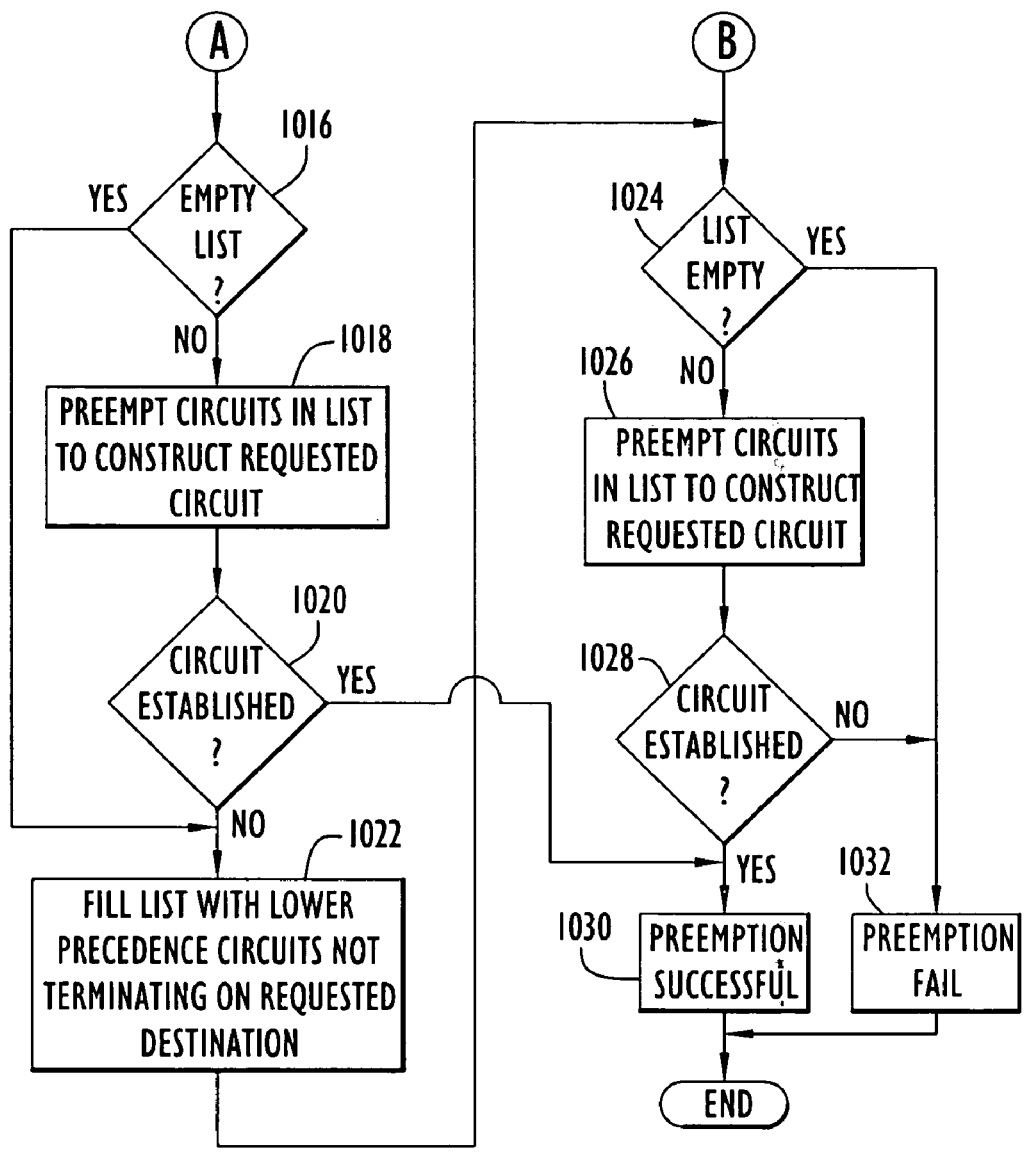

The manner in which a circuit may be preempted by the controller node is illustrated in FIGS. 10A-10B. Initially, the originating and destination nodes are examined to determine the presence of an available TDMA block and one or more available TDMA frequency channels on those blocks. The TDMA active circuit list is examined to generate a preemption candidate list. Specifically, when only the originating node does not have an available TDMA block and frequency channel as determined at step 1000, the existing lower precedence circuits established by the originating node are placed in the preemption list at step 1002. If no such lower precedence circuits exist as determined at step 1024, preemption fails at step 1032. When only the destination node does not have an available TDMA block and frequency channel as determined at step 1004, the existing lower precedence circuits that terminate at the requested destination are placed in the list at step 1006. If no such lower precedence circuits exist as determined at step 1024, preemption fails at step 1032. If the originating node and the destination node are each without an available TDMA block and frequency channel as determined at step 1008, existing lower precedence circuits that terminate at the requested destination and use the requesting originating node as a relayer (e.g., a node to relay traffic within a circuit) are placed in the preemption list. If no such lower precedence circuits exist as determined at step 1024, preemption fails at step 1032.

If the originating node and destination node each have at least one TDMA block with an available frequency channel as indicated at step 1012, the existing lower precedence circuits that terminate on the requested destination are placed in the preemption list at step 1014. If the preemption list includes candidates as determined at step 1016, the candidates are tested (e.g., starting with the lowest precedence candidates) at step 1018, until the requested circuit is established as determined at step 1020. If no candidates exist or a circuit cannot be established as determined at steps 1016, 1020, the existing lower precedence circuits that terminate on a destination other than the requested destination are placed in the preemption list at step 1022.

Once candidates exist in the preemption list (e.g., from steps 1002, 1006, 1010 or 1022) as determined at step 1024, the candidates are tested (e.g., starting with the lowest precedence candidates) at step 1026 until the requested circuit is established as determined at step 1028. Preferably, one lower precedence circuit may be preempted in order to create the new requested circuit. If a circuit cannot be established as determined at step 1028, preemption fails at step 1032. When a circuit is established as determined at step 1028, preemption is successful at step 1030.

The controller node uses the resource allocation/deallocation packet to notify network nodes of circuit activation/deactivation. When a change occurs in TDMA circuit status (e.g., circuit activation/termination, precedence change, etc.), the controller node generates and floods a packet for each changed circuit throughout the network. For example, when a TDMA circuit is created and placed on the active list, the controller node generates a resource allocation message for that circuit and transmits the message via periodic flooding in a subsequent super-epoch. This packet is transmitted using the dedicated resource allocation time slots in the TDMA time blocks. Each flooded resource allocation/deallocation packet includes the controller node identification (MAC ID) and pertinent information regarding the individual active TDMA circuits (e.g., circuit identification, ordered list of circuit participants, time block/frequency channel along each link of the circuit, a bit map indicating the TDMA time blocks and frequency channels that are occupied by the links associated with the active TDMA circuits, etc). The bit map permits nodes that enter the network to know which time blocks and frequency channels are occupied without waiting for a full cycle of resource allocation messages.

The controller node holds the resource allocation message and periodically transmits the message in the first "N" configurable slots of the first TDMA block of a super-epoch. If necessary, the controller node replaces an old resource allocation packet (having the same TDMA circuit identification) with the new packet. The controller node further configures itself to transmit/receive/block on the time blocks/frequency channels that are being used by circuit participants who are within RF range.

If a characteristic of the circuit changes during the circuit lifetime (e.g., the shortest path, resources, precedence, etc.), the controller node sends a new resource allocation message for that circuit. The controller node replaces the old message with the new message and begins flooding the new message in the subsequent super-epoch. The controller node stores and periodically transmits a resource allocation message for every active circuit. Information for any quantity of active circuits may be placed in the message in accordance with network bandwidth.

Similarly, when a TDMA circuit is removed from the active list, the controller node creates a resource deallocation packet and floods the packet in the subsequent super-epoch. This deallocation packet replaces the resource allocation packet associated with the TDMA circuit.

When no circuits are active, the controller node transmits a resource allocation message that indicates to the network nodes that no circuits are active, but that the controller node is alive and operating. Therefore, upon start-up, the controller node generates and periodically transmits this "Null" resource allocation message and suspends transmission of this message when one or more circuits are active.

The resource allocation message contains relevant circuit information for a corresponding circuit. When a new resource allocation message associated with a particular TDMA circuit identification is generated, the controller node stores and forwards a copy in the overhead slots in the first time block of the subsequent epoch. The controller node periodically transmits this message until the controller node terminates the circuit (e.g., a resource deallocation message is sent in place of the resource allocation message).

If a second circuit is activated, the controller node generates another resource allocation message for transmission. The controller node stores and forwards a copy in the overhead slot(s) of the first time block in the subsequent super-epoch, delaying by a super-epoch the transmission of the resource allocation message associated with the first circuit. The controller node continues to transmit each message in alternating super-epochs (e.g., in a round-robin fashion, where the last circuit wraps back to the first circuit). Therefore, the period of transmission (e.g., in units of super-epochs) of any individual resource allocation message is equal to the number of active circuits.

When the controller node generates a new resource allocation message, the controller node inserts newly generated messages immediately into the cycle. Thus, the message is transmitted in the next super-epoch. The controller node can either keep the message in that position in subsequent superframe cycles, or append the message to the end of the superframe cycle for other cycles. If the message relates to an existing circuit (e.g., a resource allocation message already exists for this circuit), the controller node replaces the old message with the new message and advances the position in the cycle to transmit the message in the next super-epoch.

With the last message in the cycle, the controller node sets an end of cycle flag. The nodes receiving the last message in the cycle determine the presence of any missed messages in the cycle. Since every node in the network expects to receive a message at least once per super-epoch, the nodes track when no message is received in the super-epoch, thereby indicating a missed message. The primary purpose for receiving nodes tracking an entire cycle of messages is to avoid missing the resource deallocation packets for a terminated circuit. Since the resource deallocation packets are transmitted a limited number of times, a node may miss the resource deallocation packets. If the packets are missed, the node determines that an active circuit has been terminated upon receiving a complete cycle of messages that do not include the active circuit. In this case, the node releases resources for the circuit in a manner similar to that performed in response to receiving the resource deallocation message.

Referring to FIGS. 11A and 11B, an exemplary frame 1100 includes a series of super-epochs 500 including resource allocation messages 1102. By way of example only, the controller node is transmitting resource allocation messages for three active TDMA circuits (FIG. 11A), thereby providing a cycle of three super-epochs. If the controller node generates another resource allocation message 1104 for a fourth circuit (FIG. 11B), the controller node interrupts the cycle to transmit the new resource allocation message in the subsequent super-epoch. The controller node subsequently continues the cycle as described above. When the controller node generates a new resource allocation message associated with a TDMA circuit identification for which the controller node already has a resource allocation message, the controller node replaces the old message with the new message, interrupts the cycle to transmit the new resource allocation message (e.g., as if the message is associated with a new circuit, where this may result in two messages associated with a TDMA circuit identification being transmitted) and completes the cycle from the interruption point.

The controller node includes a resource allocation message for a particular circuit in a cycle until the controller node generates a resource deallocation message for that circuit. Upon generating a resource deallocation message for a particular circuit, the controller node removes the resource allocation message from memory, interrupts the cycle with the new resource deallocation message, completes the cycle from the interruption point, continues transmission of the resource deallocation message for a configurable number of cycles and removes the resource deallocation message from memory after the configurable number of cycles.

Each node in the network that receives the resource allocation/deallocation packet participates in the flooding process. Each resource allocation packet provides information pertaining to the status, participants resource (e.g., TDMA block and channel) allocations for a particular TDMA circuit in the network and information regarding each TDMA time block/frequency channel allocated to each active TDMA circuit in the network.

Each node in the network receives one resource allocation packet in each super-epoch. The end of cycle indicator that accompanies the last resource allocation packet in the cycle allows a circuit participant to monitor whether or not a resource allocation packet for an associated circuit was included in the cycle. If a packet was not recalled in the cycle, the circuit participant internally terminates the circuit as described below, provided that the circuit participant has not missed any resource allocation messages within the cycle. Preferably, each node in the network blocks itself from transmitting on TDMA blocks and channels allocated to other nodes for TDMA operation (e.g., regardless of whether or not the TDMA participants are within RF range of each other). However, re-use of frequencies for simultaneous TDMA operation may be utilized.

Figure 12:
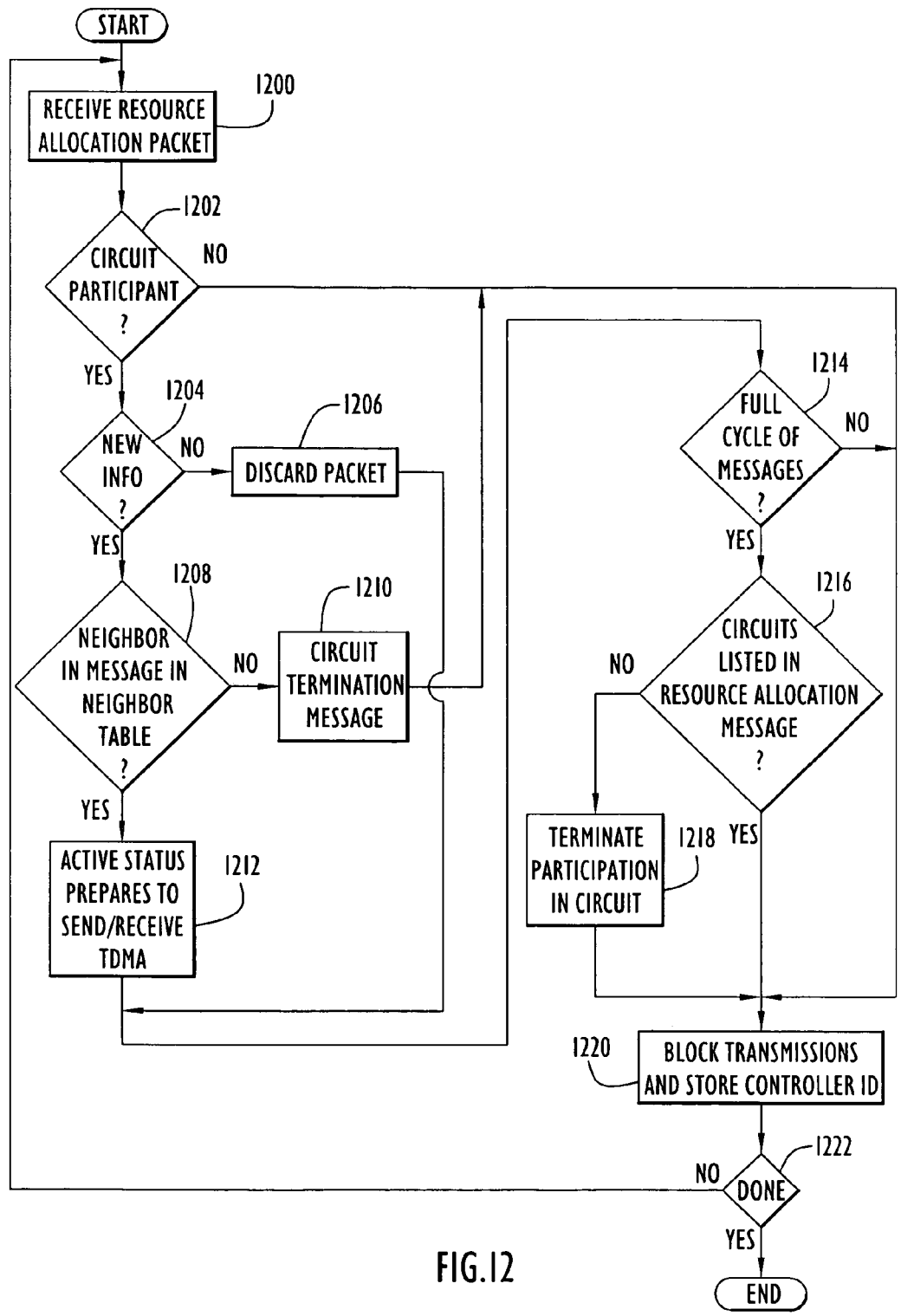
FIG. 12 is a procedural flow chart illustrating the manner in which a resource allocation packet is processed by a network node according to the present invention.

The manner in which network nodes process the resource allocation packet is illustrated in FIG. 12. Initially, the nodes in the network receive a TDMA resource allocation packet at step 1200. An originating node awaiting a status on a circuit set-up request checks for a resource allocation packet associated with its TDMA circuit identification. The originating node monitors the precedence associated with the circuit listed in the message to verify that the precedence matches the precedence of the data stream. If the precedence of the packet does not match that of the data stream, the originating node transmits a change of precedence message to the controller node as described below.

The nodes check to determine status as circuit participants for the TDMA circuit listed in the resource allocation message. If a node is a circuit participant and information in the resource allocation message is a repeat of already known information as determined at steps 1202, 1204, the node discards the message at step 1206 and tracks whether the end of cycle indicator is set as described below. If the information in this resource allocation message is new, the node verifies that the upstream and/or downstream TDMA neighbor specified in the message is in the neighbor table. When the neighbor is absent from the neighbor table as determined at step 1208, the node transmits a circuit terminate message to the controller node with a specified reason at step 1210.

If the neighbor is present within the neighbor table, the circuit participant marks itself in "active" mode for the circuit and prepares to transmit/receive TDMA data on the specified TDMA block and frequency channel for each TDMA link at step 1212, where notification of activation is preferably accomplished via an internal network resource reservation message.

The circuit participants determine whether a full cycle of resource allocation messages have been received at step 1214. When the full cycle is received, the participants check, at the end of the cycle, that the circuit(s) in which the nodes are participating were listed in one of the resource allocation messages for that cycle. If no message was received as determined at step 1216, the circuit participant terminates participation in that circuit at step 1218.

The nodes in the network use information in the bit map to block transmissions on TDMA time blocks/frequency channels assigned to circuits and store the controller node identification at step 1220. The bit map marks the TDMA time blocks and frequency channels that are allocated to the TDMA circuits in the network as described above. Therefore, the circuit participant avoids accidentally blocking transmissions/receptions on time blocks/frequency channels that are assigned to the originating node for receiving or transmitting TDMA traffic. The above process is repeated for additional messages until a terminating condition (e.g., power down, etc.) occurs as determined at step 1222.

Upon having an outgoing TDMA image packet available (e.g., received from a host system) for transmission to a specified destination on an established circuit, the originating node queues the packets and transmits the packets once the circuit is activated by the controller node. In response to receiving an incoming TDMA packet for an active circuit, a final destination node forwards the packet up to the IP stack for processing.

In the course of operation, a TDMA originating node may not immediately have an image packet available for transmission when the originating node TDMA block occurs. In this case, the originating node sends a keep alive message that does not contain any user traffic. This message is required since the destination node otherwise perceives the empty TDMA block as an indication of upstream circuit failure. The destination node discards received keep alive packets.

If a relayer or destination node has not received a first TDMA packet in the expected receive time block, or an originator node has no packet to transmit, these nodes generate and transmit a single in-band keep alive packet in a corresponding transmit time block. The node increments a counter when a keep alive packet is transmitted. After transmitting a configurable number of keep alive messages, an originator node assumes that the data stream has stopped and proceeds to terminate the circuit, while a relayer presumes an upstream link failure and proceeds to terminate the circuit.

Figure 13:
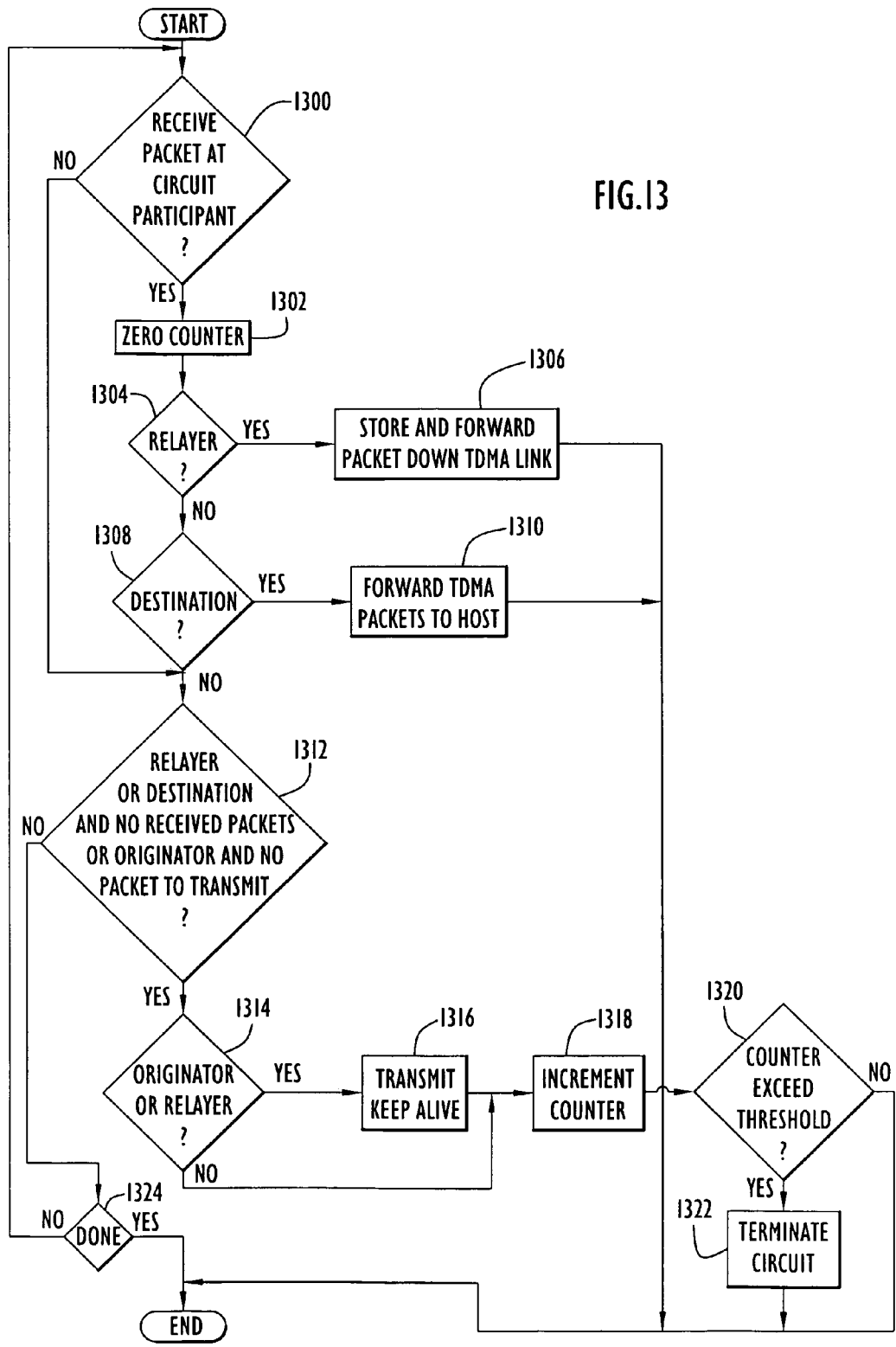
FIG. 13 is a procedural flow chart illustrating the manner in which a packet is transmitted through the network according to the present invention.

The manner in which network nodes receive and process TDMA packets is illustrated in FIG. 13. Initially, upon receiving the first keep alive/image packet, a circuit participant zeroes the counter and assumes normal operation in active mode. Once in this active mode, the node expects to receive and/or transmit a keep alive/image packet in each super-epoch. In particular, if a circuit participant (e.g., originator, relayer, or destination node) receives one or more TDMA packets as determined at step 1300, the circuit participant zeros the circuit inactive counter at step 1302. When the circuit participant is a relayer as determined at step 1304, the node stores and forwards a received TDMA packet down the TDMA link in the assigned TDMA time block at step The relayer does not keep a copy of received TDMA packets. If the circuit participant is a destination node as determined at step 1308, the node processes the received TDMA packets or forwards them to a host for processing at step 1310. When the circuit participant is a relayer or destination node and the node does not receive any TDMA packets in the expected time block, or if the node is an originator or relayer and has no packet to transmit as determined at step 1312, the node transmits a self-generated keep alive message in the assigned TDMA time block at step 1316 upon being an originator or relayer as determined at step 1314 and increments the counter at step 1318. Further, the node checks if the counter exceeds the configured maximum value. If the counter exceeds the maximum value as determined at step 1320, the node assumes either that the data stream has stopped (originator) or link failure (relayer/destination) and terminates the circuit as described below at step 1322. The above process continues until a terminating condition (e.g., power down) occurs as determined at step 1324.

An established circuit may encounter a change in precedence level as a consequence of a change in the data being transmitted on that circuit. The originating node informs the controller node of a precedence change in data (e.g., arriving from a host computer system) associated with either an active or pending circuit. The originating node sends a point-to-point change of precedence message using CSMA/CA to the controller node. The originating node further applies a sequence number to this message, and increments the sequence number each time a new change of precedence message is sent for the same TDMA circuit identification. The circuit precedence level is compared to the precedence level of each TDMA packet. A higher order precedence packet raises the precedence level of the circuit, while presence of only lower order precedence packets for a configurable time period lowers the precedence of the circuit.

Figure 14:
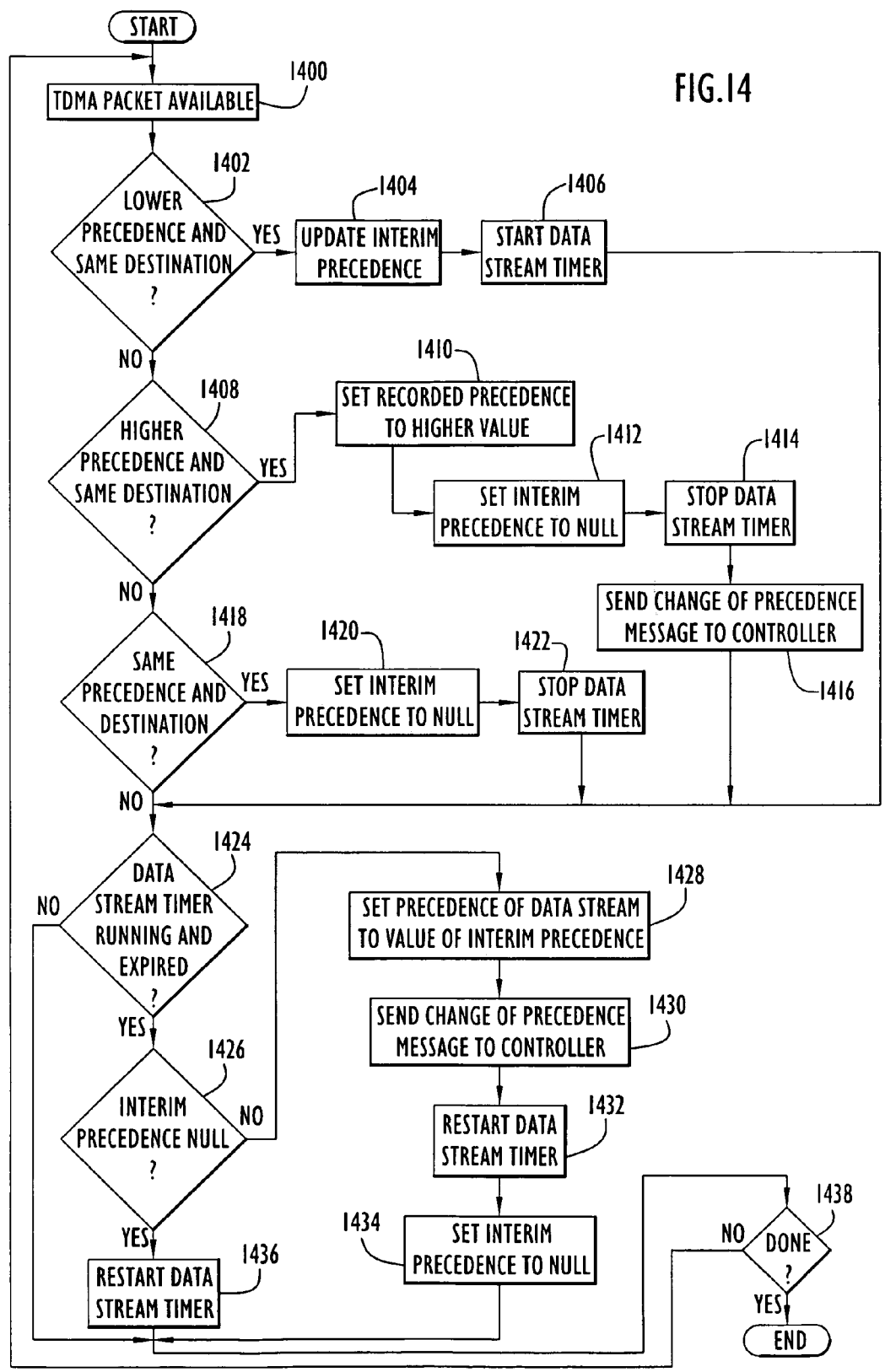
FIG. 14 is a procedural flow chart illustrating the manner in which a change in precedence level is handled according to the present invention.

The manner in which a change in precedence level of a circuit is accommodated is illustrated in FIG. 14. Initially, the originating node creates a variable, interim precedence, which is used for tracking the precedence levels of TDMA packets originated by that node. When a deterministic or image packet is available (e.g., arrives from a host system), and there is no active or pending circuit originated by the node and corresponding to the packet destination, the originating node records the circuit precedence value as the precedence value associated with that packet as part of the circuit set-up procedure. The originating node further sets the interim precedence to a NULL value. NULL is considered to be a precedence value that is lower than any existing operational value. Specifically, a TDMA packet is available for transmission (e.g., received from a host system) over an existing circuit at step 1400. When the TDMA packet includes a lower precedence than, and the same destination as, the current circuit as determined at step 1402, the originating node updates the interim precedence with the higher of the interim precedence current value or the precedence of the newly received packet at step 1404 and starts a data stream timer at step 1406.

If the TDMA packet includes a higher precedence than, and the same destination as, the current circuit as determined at step 1408, the originating node sets the recorded circuit precedence to the higher value at step 1410 and sets the interim precedence to NULL at step 1412. The data stream timer is further stopped at step 1414 and a change of precedence message is sent to the controller at step 1416. When the TDMA packet includes the same precedence and destination as the circuit as determined at step 1418, the originating node sets the interim precedence to NULL at step 1420 and stops the data stream timer at step 1422.

Upon expiration of the data stream timer as determined at step 1424, the originating node inspects the interim precedence. If the interim precedence is not NULL as determined at step 1426, the precedence level associated with the current data stream is set to the interim precedence value at step 1428. The originating node further sends a change of precedence message to the controller at step 1430, restarts the data stream timer at step 1432, and sets the interim precedence to NULL at step 1434. Otherwise, when the interim precedence is NULL as determined at step 1426, the originating node restarts the data stream timer at step 1436. The above process continues until detection of a terminating condition (e.g., power down, etc.) as determined at step 1438.

When sending a change of precedence message to the controller, the originating node starts a response timer. When the response timer expires and a resource allocation packet does not indicate the change in circuit precedence for the active circuit, or a circuit pending status message is not received for a pending circuit, the originating node re-sends the change of precedence message and re-starts the timer. This cycle continues until either the controller indicates the change or the TDMA circuit is terminated. Upon receipt of the change of precedence message, the controller records the change in the appropriate active or pending list.

There are many circumstances in which a node may become aware of or initiate termination of a circuit. For example, an image data stream may stop during any stage of the circuit (e.g., setup, pending or active mode, etc.). If the data flow stops for a configurable period of time, the originating node initiates the circuit termination process by transmitting a CSMA/CA message to the controller node indicating circuit termination. The controller node transmits a resource deallocation packet as described below, where the originating node releases the circuit resources and performs internal clean-up operations in response to receipt of the deallocation packet. When a circuit relayer or destination node detects inactivity on the circuit, the node transmits a CSMA/CA circuit terminate message to the controller. Upon receipt of the resulting resource deallocation packet from the controller, the originating node releases the circuit resources and performs internal clean-up operations as described above.

Further, circuit termination may commence in response to a lost route to a destination. Upon being selected as a controller, the controller node sets a circuit end-point timer. When the end-point timer expires, the controller node restarts the timer and checks a forwarding table for a route to the TDMA circuit destination of each of the active circuits. If a route to any destination node is not found in the forwarding table, the controller node terminates the corresponding circuit to ensure that resources are not wasted on nodes that are no longer members of the network. The circuit end-point timer is terminated when the node is demoted from controller status.

When information in a received resource deallocation message is old, the receiving node tracks whether or not the end of cycle indicator is set and discards the message. If the information in a resource deallocation message is new, receiving nodes internally release the circuit resources. Specifically, each circuit participant (e.g., originating node, relayer node, destination node, etc.) receiving new information in a resource deallocation packet releases the corresponding circuit resources. The circuit participant subsequently performs internal clean-up operations. The other nodes in the network that are not circuit participants remove transmission blocks on the specified TDMA block and frequency channels that were used for the active TDMA circuit. If a circuit pending flag is set in the message, the originating node transitions to a pending mode and continues to queue packets (e.g., arriving from a host system) for transmission. When the data flow stops, the originating node sends a circuit terminate message to the controller.

Moreover, if a node receives a resource allocation message and is listed as an originating node for a circuit that it does not have in set-up or pending mode, the node sends a circuit terminate message to the controller node. Upon receipt of the resulting resource deallocation packet, the originating node releases resources for the circuit, and performs internal clean-up operations. In addition, circuit termination may commence in response to changes in neighboring nodes. For example, upon receiving notification that there is a change in a neighbor table, a circuit participant (e.g., originator, relayer, destination, etc.) verifies that the TDMA circuit neighbors are still in the table. If the neighbors are not in the table, the circuit participant transmits a CSMA/CA circuit terminate message to the controller. In response to receipt of the resulting resource deallocation packet, the circuit participant releases resources for the circuit. Further, when a node loses its neighbors and becomes isolated from the network, the node releases resources for the active circuits. If the node is the originator of a circuit, the node re-sends the circuit set-up request to the controller node once the node has rejoined the network and can receive resource allocation messages originated by the controller.

Figure 15:
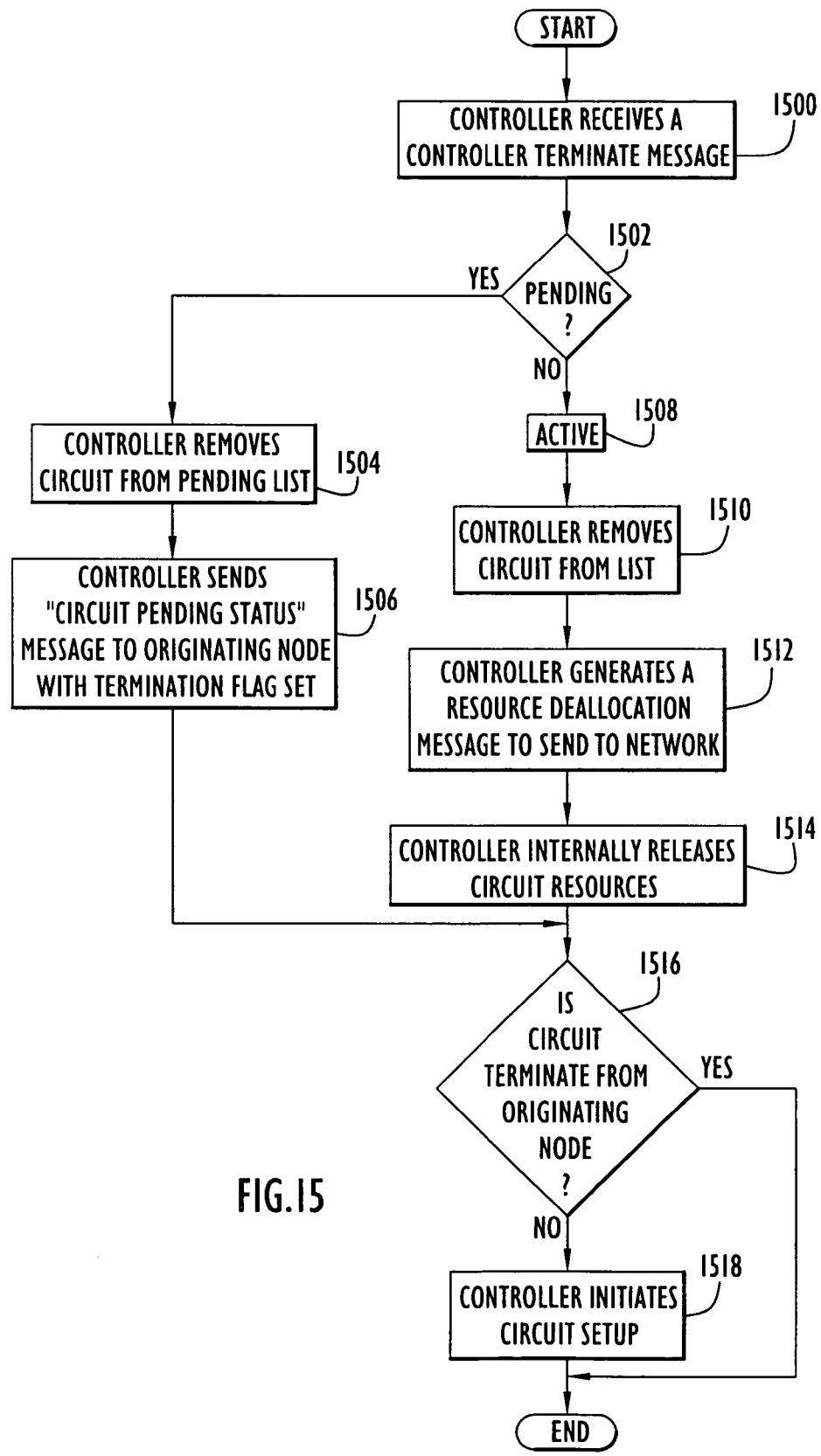
FIG. 15 is a procedural flow chart illustrating the manner in which a circuit is terminated according to the present invention.

The manner in which a circuit is terminated is illustrated in FIG. 15. Initially, a circuit terminate message is received by the controller node at step 1500. The message may be sent in response to the above conditions or other events that initiate termination of a circuit. If the circuit requested for termination is pending as determined at step 1502, the controller removes the circuit from the pending list at step 1504 and sends a circuit pending status message to the originating node with a termination flag set at step 1506. When the circuit is active as indicated at step 1508, the controller node removes the circuit from the active list at step 1510 and generates a resource deallocation message to send to the network at step 1512. The controller node further internally releases the circuit resources at step 1514. If the circuit terminate message is received from a circuit participant other than the originating node as determined at step 1516, the controller immediately re-initiates the circuit set-up process at step 1518 since this indicates a failed data link in the circuit.

A node may receive a resource allocation message for an already active circuit, where the resource allocation message indicates a different assigned set of resources (time blocks/frequency channels) for the receiving node. If the receiving node was previously a circuit participant (e.g., originator, relayer, destination, etc.), but is not listed in the resource allocation message, the node frees the resources for the circuit. The circuit participant performs internal clean-up operations since the circuit participant is no longer a part of the circuit. However, if the receiving node was a circuit participant and is still listed in the resource allocation message, the node re-allocates the resources for the circuit. When the receiving node was not previously a circuit participant (e.g., originator, relayer, destination, etc.) and is now listed in the resource allocation message, the node allocates the resources for the circuit. The remaining nodes in the network that are not circuit participants modify the set of blocked time blocks and corresponding frequency channels according to the contents of the message.

If a node misses a configurable number of successive resource allocation/deallocation messages, the node releases resources for the active circuits. The node expects to receive a minimum of one type of resource allocation/deallocation packet each super-epoch as described above. If by the end of a super-epoch, the node has not received a resource allocation/deallocation message, the node increments an inactive counter that is maintained by all nodes with the exception of the controller. Upon receipt of a resource allocation/deallocation message, the node zeros the counter. If the counter exceeds a configured maximum value, the node assumes that the controller is inactive and releases resources for all active calls. If the node is the originator of a circuit, and data is still available for transmission (e.g., received from a host system), the node re-sends the circuit set-up request to the controller node once the node begins to receive resource allocation/deallocation messages.

While the present invention has been described and represented within a network architecture, the present invention may be implemented solely as software as well as a combination of both software and hardware, or even as hardware alone. The above description is not meant to limit the present invention to a hardware design or a particular network architecture, as many variations are possible and within the scope of the description provided thus far.

It will be appreciated that the embodiments described above and illustrated in the drawings represent only a few of the many ways of implementing a method and apparatus for dynamic channel access within wireless networks.

Communication networks using the present invention nodes may include any quantity of those nodes and may be of any type of network (e.g., cluster based, CBT, Ad-Hoc wireless, etc.). Any quantity of network nodes may serve as a controller, source, relayer and/or destination node to transfer information, where the node functions may be assigned in any fashion via any conventional or other techniques (e.g., predetermined, dynamically assigned, etc.). The network nodes may be arranged in any fashion into any quantity of tiers each having any quantity of nodes. The nodes may communicate via any suitable communications medium (e.g., wired or wireless communication devices, etc.). The present invention may be employed to transfer any types of information (e.g., image, control, etc.) via the TDMA circuits, CSMA or other protocol.

The present invention node may include any quantity of conventional or other transmitters, receivers and/or transceivers, where each transmitter or transceiver may transmit signals at any suitable frequency and in any suitable energy form (e.g., radio signals, microwave, optical signals, etc.), and any quantity of conventional or other receivers or transceivers, where each receiver or transceiver may receive signals at any suitable frequency and in any suitable energy form (e.g., radio signals, microwave, optical signals, etc.). The present invention node may include any quantity of independent transmitting and/or receiving devices, may utilize any quantity of frequency channels of any desired frequencies and may send any type of data. The present invention node may further include any quantity of any types of devices (e.g., flight computer, processors, image capture, etc.) for a particular application. The present invention node may include any type of identification including any quantity of any type of symbols or characters (e.g., numeric, alphabetic, alphanumeric, etc.), preferably including a predetermined hierarchy or order.

The processor of the present invention node may be implemented by any conventional or other microprocessor, controller or circuitry to perform the functions described herein, while any quantity of processors or processing devices or circuitry may be employed within the present invention node where the processor functions may be distributed in any fashion among any quantity of hardware and/or software modules, processors or other processing devices or circuits. The software for the processor of the present invention node may be implemented in any suitable computer language, and could be developed by one of ordinary skill in the computer and/or programming arts based on the functional description contained herein and the flow charts illustrated in the drawings. Further, any references herein of software performing various functions generally refer to processors performing those functions under software control. The software and/or algorithms described above and illustrated in the flow charts may be modified in any manner that accomplishes the functions described herein. The present invention node may alternatively include any components arranged in any fashion to facilitate information transfer in the manner described above.

The packets or messages transmitted by the network (e.g., resource allocation/deallocation, image information, flood, circuit requests, circuit terminate, LSA, etc.) may be of any size, may have any format and may contain any desired information. The packets may be transmitted via any transmission scheme (e.g., point-to-point, CSMA, TDMA, etc.) and/or at any suitable transmission rate (e.g., with any desired interval between transmissions). The various messages or packets may include any identifier to identify the type of message or packet. The packets may be broadcasted or transmitted any quantity of times. Any quantity of resource allocation messages may be sent for a corresponding circuit in any quantity of epochs. A resource allocation for a new circuit may be sent at any desired time (e.g., at the beginning, intermediate or end portion of a cycle, etc.).

The architecture or super-epoch may be of any quantity and include any quantity of any types of epochs (e.g., CSMA, TDMA, etc.) arranged in any fashion with any quantity of any types of time slots. The architecture may include any desired period, where the time slots and epochs may include any desired durations. The super-epoch may be configured for communication between nodes separated by any quantity of hops. The slots may be reserved or assigned in any manner (e.g., static, dynamic, central, distributive, etc.) based on any desired conditions or applications, where the architecture (e.g., epochs, time slots, etc.) may be arranged in any fashion. The assignment may assign any time slots from any epochs to corresponding nodes or links in any desired order. The epochs may be assigned to TDMA and CSMA traffic in any fashion (e.g., odd and even epochs, consecutive epochs, etc.). The architecture may include any quantity of control or other slots (e.g., reserved for specific purposes, for a particular application, etc.) arranged in any fashion. The present invention and/or architecture may be structured to be compatible with any network or transmission scheme (e.g., time division multiplexing, TDMA, etc.).

The controller node may be selected in any fashion based on any conditions or events (e.g., identifications, configurations, predetermined, dynamically, etc.). The nodes may be configured in any fashion or include any desired states with respect to being selected as a controller (e.g., always selected or mandatory, never selected, etc.).

The precedence level may be indicated within any field of a message or packet by any suitable identifier (e.g., alphanumeric or other value, etc.). The nodes may transmit packets or messages based on the precedence level or other conditions in any fashion or combination (e.g., highest precedence first, lowest precedence first, age, precedence in combination with age, etc.). The precedence level for a circuit may be changed in any manner based on any conditions (e.g., the precedence of data transmitted within any interval, based on a precedence threshold, etc.).

The tables and lists (e.g., TDMA block and frequency channel, pending and active circuit lists, etc.) may include any desired information and may be arranged in any fashion. The bit map may be implemented by any data storage unit or structure and may include any desired information and be arranged in any fashion (e.g., TDMA block and frequency channel allocation, etc.). The circuits within lists (e.g., active, pending, preemption candidate, etc.) may be processed based on any desired criteria or combinations of criteria (e.g., precedence, age, etc.). The resource allocation (e.g., TDMA blocks and frequency channels, etc.) for circuits may be determined in any fashion via any conventional or other techniques (e.g., shortest path first or other routing algorithm to compute paths, etc.). The starting and successive time blocks examined for each circuit link may be selected based on any conditions (e.g., next block from a prior link, examine blocks separated by a particular time interval (e.g., every second or third block, etc.), wrapping around in any fashion, etc.). The frequency channels may be selected in any fashion and may be re-used within a circuit in any manner for different links.

The timers and counters employed by the present invention may be implemented by any conventional or other timers and counters (e.g., hardware or software counters or timers, etc.) and may be utilized to measure time intervals of any duration and thresholds of any values. The various time intervals and thresholds for conditions associated with the timers and counters (e.g., data stream timer, response timer, controller selection timer, pending list timer, circuit end-point timer, controller inactive counter, etc.) may be set to any desired time intervals or threshold values.

The present invention may preempt any quantity of circuits based on any desired conditions or combination of conditions (e.g., lower or higher precedence, age, etc.) to establish a new circuit. The candidates for preemption may be selected in any fashion based on any desired criteria (e.g., common source or destination, common paths or nodes, etc.).

The database update and neighbor discovery packets may be transmitted at any desired intervals and/or in response to any desired events or conditions. The node database may be implemented by any conventional database or other storage structure (e.g., processor memory, external memory, file, data structure (e.g., array, queue, stack, etc.), etc.) and may have any desired storage capacity to contain any desired information.

The various variables described above (e.g., T, N, etc.) are preferably integers; however, the variables may be of any type of numbers (e.g., real, integer, etc.).

It is to be understood that the present invention is not limited to the applications or networks described herein, but may be utilized for various communication applications or networks, especially wireless Ad-Hoc networks. For example, the present invention may be utilized for general networking applications that require QoS for multimedia traffic in a mobile, ad-hoc network under various conditions (e.g., air terrain, buildings, etc.).

From the foregoing description, it will be appreciated that the invention makes available a novel method and apparatus for dynamic channel access within wireless networks, wherein a scheme for circuit establishment, maintenance and bandwidth reservation over IP networks allows for transfer of deterministic or image data between any two mobile nodes within a self-forming network supporting integrated deterministic/non-deterministic traffic flows.

Having described preferred embodiments of a new and improved method and apparatus for dynamic channel access within wireless networks, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed:

1. A wireless mobile communication unit to transmit and receive information within a wireless communications network including a plurality of hops, wherein said information includes deterministic data with a periodic occurrence and non-deterministic data with a random frequency of occurrence, said wireless mobile communication unit comprising:
   a transmitter to transmit outgoing information to at least one other wireless mobile communication unit within the network;
   a receiver to receive incoming information from at least one other wireless mobile communication unit within the network; and
   a processor to control the transmission and reception of the outgoing and incoming information within said wireless mobile communication unit, wherein said processor includes:
      a circuit interface module to facilitate transfer of said deterministic data over at least one communication circuit established within said network for transferring said deterministic data by a wireless mobile communication unit of said network serving as a controller unit, wherein each communication circuit is associated with a corresponding destination communication unit, wherein said at least one communication circuit employs a time division multiplexing scheme including one or more time slots allocated to transfer said deterministic data to said associated destination unit, and wherein at least one said communication circuit spans across at least two said hops of said network and transfers said deterministic data through at least one intermediate wireless mobile communication unit to said corresponding destination unit;
      a transfer module to transfer said non-deterministic data with other communication units via a communication scheme other than said at least one communication circuit with said time division multiplexing scheme utilized for said deterministic data; and
      a controller module to establish said at least one communication circuit between communication units to transfer said deterministic data and to manage resources and allocate said time slots for each said communication circuit within said wireless network in response to said wireless mobile communication unit being designated as said controller unit, wherein said time slots for transmission of said deterministic data are allocated to at least two wireless mobile communication units in communication range of each other and within adjacent hops of said network.

2. The unit of claim 1, wherein said network includes an ad-hoc wireless network and said time division multiplexing scheme includes time division multiple access (TDMA).

3. The unit of claim 2, wherein said deterministic data includes image information, and said other communication scheme includes a Carrier Sense Multiple Access/Collision Avoidance (CSMA/CA) communication scheme.

4. The unit of claim 3, wherein information is transferred between communication units via a communication architecture including a plurality of epochs with each epoch including a series of time slots, and wherein at least one epoch is utilized for transference of TDMA deterministic data and at least one epoch is utilized for transference of CSMA non-deterministic data.

5. The unit of claim 1, wherein said processor further includes:
   a controller selection module to select said controller unit based on a configuration status and identification of said communication units, wherein said configuration status indicates a preference of a communication unit to be designated as a controller unit.

6. The unit of claim 1, wherein said controller module includes:
   a flood module to facilitate transmission of resource allocation information for a communication circuit to the communication units in a manner to enable constructive superposition to enhance signal strength.

7. The unit of claim 1, wherein said circuit interface module includes:
   a request module to facilitate transmission of a request to said controller unit to establish a communication circuit in response to the absence of a communication circuit to an intended destination communication unit.

8. The unit of claim 7, wherein said controller module includes:
   a circuit module to establish a communication circuit between communication units in response to receiving said request.

9. The unit of claim 8, wherein said circuit module includes:
   a resource allocation module to determine a routing path for said requested communication circuit and availability of resources for each link in said routing path to establish said requested communication circuit.

10. The unit of claim 9, wherein said circuit module further includes:
    a preemption module to disable at least one communication circuit of lower priority than said requested communication circuit to enable resources of said disabled circuit to be utilized to establish said requested communication circuit in response to the absence of sufficient resources to construct said requested communication circuit.

11. The unit of claim 10, wherein said circuit interface module further includes:
    a priority module to monitor a priority of each said at least one communication circuit based on said priority of information transferred over that circuit and to notify said controller unit of changes in said circuit priority.

12. The unit of claim 1, wherein said circuit interface module includes:
a circuit terminate module to facilitate transmission of a request to said controller unit to terminate a communication circuit based on conditions affecting transfer of information.

13. The unit of claim 12, wherein said controller module includes:
a resource module to terminate a communication circuit and release resources for that communication circuit in response to said termination request.

14. A wireless communications network including a plurality of hops for transferring information, wherein said information includes deterministic data with a periodic occurrence and non-deterministic data with a random frequency of occurrence, said communications network comprising:
a plurality of wireless mobile communication nodes for transferring said deterministic data therebetween over at least one communication circuit established within said network for transferring said deterministic data and employing a time division multiplexing scheme including one or more time slots allocated to transfer said deterministic data, wherein each communication circuit is established by a wireless mobile communication node of said network serving as a controller node and is associated with a corresponding destination node, and for transferring said non-deterministic data via a communication scheme other than said at least one communication circuit with said time division multiplexing scheme utilized for said deterministic data, wherein a wireless mobile node within said network is designated as said controller node to establish said at least one communication circuit between communication nodes to transfer said deterministic data and to manage resources and allocate said time slots for each said communication circuit within said wireless network, wherein at least one said communication circuit spans across at least two said hops of said network and transfers said deterministic data through at least one intermediate wireless mobile communication node to said corresponding destination node, and wherein said time slots for transmission of said deterministic data are allocated to at least two wireless mobile communication nodes in communication range of each other and within adjacent hops of said network.

15. The network of claim 14, wherein said network includes an ad-hoc wireless network and said time division multiplexing scheme includes time division multiple access (TDMA).

16. The network of claim 14, wherein said deterministic data includes image information, and said nodes transfer said non-deterministic data via a Carrier Sense Multiple Access/Collision Avoidance (CSMA/CA) communication scheme.

17. The network of claim 14, wherein said controller node includes:
a flood module to transmit resource allocation information for a communication circuit to the communication nodes in a manner to enable constructive superposition to enhance signal strength.

18. The network of claim 14, wherein said controller node includes:
a resource allocation module to determine a routing path for a requested communication circuit and availability of resources for each link in said routing path to establish said requested communication circuit.

19. The network of claim 18, wherein said controller node further includes:
a preemption module to disable at least one communication circuit of lower priority than said requested communication circuit to enable resources of said disabled circuit to be utilized to establish said requested communication circuit in response to the absence of sufficient resources to construct said requested communication circuit.

20. A method of transferring information between wireless mobile communication units within a wireless network including a plurality of hops, wherein said information includes deterministic data with a periodic occurrence and non-deterministic data with a random frequency of occurrence, said method comprising:
(a) transferring said deterministic data over at least one communication circuit established within said network for transferring said deterministic data and employing a time division multiplexing scheme including one or more time slots allocated to transfer said deterministic data, wherein each communication circuit is established by a wireless mobile communication unit of said network serving as a controller unit and is associated with a corresponding destination communication unit, and transferring said non-deterministic data with other communication units via a communication scheme other than said at least one communication circuit with said time division multiplexing scheme utilized for said deterministic data; and
(b) establishing said at least one communication circuit between communication units to transfer said deterministic data and managing resources and allocating said time slots for each said communication circuit within said wireless network via a wireless mobile communication unit designated as said controller unit, wherein at least one said communication circuit spans across at least two said hops of said network and transfers said deterministic data through at least one intermediate wireless mobile communication unit to said corresponding destination communication unit, and wherein said time slots for transmission of said deterministic data are allocated to at least two wireless mobile communication units in communication range of each other and within adjacent hops of said network.

21. The method of claim 20, wherein said network includes an ad-hoc wireless network and said time division multiplexing scheme includes time division multiple access (TDMA).

22. The method of claim 21, wherein said deterministic data includes image information, and step (a) further includes:
(a.1) transferring said non-deterministic data between communication units via a Carrier Sense Multiple Access/Collision Avoidance (CSMA/CA) communication scheme.

23. The method of claim 22, wherein information is transferred between communication units via a communication architecture including a plurality of epochs with each epoch including a series of time slots, and wherein at least one epoch is utilized for transference of TDMA deterministic data and at least one epoch is utilized for transference of CSMA non-deterministic data.

24. The method of claim 20, wherein step (b) further includes:
(b.1) selecting said controller unit based on a configuration status and identification of said communication units, wherein said configuration status indicates a preference of a communication unit to be designated as a controller unit.

25. The method of claim 20, wherein step (b) further includes:
- (b.1) transmitting resource allocation information for a communication circuit from said controller unit to the communication units in a manner to enable constructive superposition to enhance signal strength.

26. The method of claim 20, wherein step (a) further includes:
- (a.1) transmitting a request to said controller unit to establish a communication circuit in response to the absence of a communication circuit to an intended destination communication unit.

27. The method of claim 26, wherein step (b) further includes:
- (b.1) establishing a communication circuit between communication units in response to receiving said request.

28. The method of claim 27, wherein step (b.1) further includes:
- (b.1.1) determining a routing path for said requested communication circuit and availability of resources for each link in said routing path to establish said requested communication circuit.

29. The method of claim 28, wherein step (b.1) further includes:
- (b.1.2) disabling at least one communication circuit of lower priority than said requested communication circuit to enable resources of said disabled circuit to be utilized to establish said requested communication circuit in response to the absence of sufficient resources to construct said requested communication circuit.

30. The method of claim 29, wherein step (a) further includes:
- (a.2) monitoring a priority of each said at least one communication circuit based on said priority of information transferred over that circuit and notifying said controller unit of changes in said circuit priority.

31. The method of claim 20, wherein step (a) further includes:
- (a.1) transmitting to said controller unit a request to terminate a communication circuit based on conditions affecting transfer of information.

32. The method of claim 31, wherein step (b) further includes:
- (b.1) terminating a communication circuit and releasing resources for that communication circuit in response to said termination request.

* * * * *